US012493271B2

(12) United States Patent
Mills et al.

(10) Patent No.: US 12,493,271 B2
(45) Date of Patent: Dec. 9, 2025

(54) APPARATUS AND METHOD FOR PROVIDING A CLOUD CONTROLLED, GRID OPTIMIZING SELECTIVE FILTERED FRESH AIR SOURCE USING EXISTING OR NEW DUCTING

(71) Applicant: CentraVent, LLC, Cameron Park, CA (US)

(72) Inventors: Kirk Mills, Cameron Park, CA (US); Kimberley Mills, Cameron Park, CA (US)

(73) Assignee: CentraVent, LLC, Phoenix, AZ (US)

( * ) Notice: Subject to any disclaimer, the term of this patent is extended or adjusted under 35 U.S.C. 154(b) by 545 days.

(21) Appl. No.: 18/097,027

(22) Filed: Jan. 13, 2023

(65) Prior Publication Data

US 2023/0205159 A1 Jun. 29, 2023

Related U.S. Application Data

(63) Continuation-in-part of application No. 17/855,070, filed on Jun. 30, 2022, now Pat. No. 12,152,794.

(Continued)

(51) Int. Cl.
*G05B 19/042* (2006.01)

(52) U.S. Cl.
CPC .... *G05B 19/042* (2013.01); *G05B 2219/2614* (2013.01)

(58) Field of Classification Search
CPC ...................... G05B 19/042; G05B 2219/2614
See application file for complete search history.

(56) References Cited

U.S. PATENT DOCUMENTS 1,924,489 A 8/1933 Ferris
1,931,156 A 10/1933 Persons (Continued)

FOREIGN PATENT DOCUMENTS

WO WO/1996/023152 8/1996
WO WO/2005/071324 8/2005

(Continued)

OTHER PUBLICATIONS

Field Controls, LLC, Fresh Air Systems webpages, http://www.fieldcontrols.com (Jul. 3, 2018).

*Primary Examiner* — Mohammad Ali
*Assistant Examiner* — Vincent W Chang
(74) *Attorney, Agent, or Firm* — Reisler & Associates

(57) ABSTRACT

An apparatus and method for providing a cloud controlled, grid optimizing selective alternative filtered fresh air source using existing or new ducting is disclosed. An example embodiment includes: a central ventilation green cooling system comprising: a selective fan or vent cooling system installed in a structure, the selective fan or vent cooling system including a first controller; a selective filtered fresh air sourcing system installed in the structure, the selective filtered fresh air sourcing system including a second controller; a mobile software application in wireless data communications with the first and second controllers, the mobile application also in data communications with a plurality of internet-connected data sources via an internet cloud interface, the internet-connected data sources including power grid monitoring sites, solar array sites, weather data sites, the mobile software application configured to control the selective fan or vent cooling system and the selective filtered fresh air sourcing system based on power grid loading information and solar array generation capacity information obtained from the internet-connected data sources.

21 Claims, 13 Drawing Sheets

Related U.S. Application Data

(60) Provisional application No. 63/289,770, filed on Dec. 15, 2021.

(56) References Cited

U.S. PATENT DOCUMENTS

| | | | |
|---|---|---|---|
| 2,278,581 A | | 4/1942 | Macdougald |
| 2,349,627 A | | 5/1944 | Kemmer |
| 2,483,377 A | | 9/1949 | Young |
| 2,612,831 A | | 10/1952 | Lohman, Jr. |
| 2,668,491 A | | 2/1954 | Gerlitz |
| 2,875,678 A | | 3/1959 | Wyley |
| 3,727,424 A | | 4/1973 | Edens |
| 3,792,593 A | | 2/1974 | Loos |
| 4,018,266 A | | 4/1977 | Kay |
| 4,261,255 A | | 4/1981 | Anderson |
| 4,375,183 A | | 3/1983 | Lynch |
| 4,385,550 A | | 5/1983 | Steiner |
| 4,416,415 A | | 11/1983 | Kolt |
| 4,501,194 A | | 2/1985 | Brown |
| 4,501,389 A | | 2/1985 | Kolt |
| 4,510,851 A | | 4/1985 | Samosky |
| 4,594,940 A | | 6/1986 | Wolbrink |
| 4,596,180 A | | 6/1986 | Steiner |
| 4,628,802 A | | 12/1986 | Steiner |
| 4,766,806 A | | 8/1988 | Tomiser, Jr. |
| 4,779,518 A | | 10/1988 | Artwick |
| 4,784,049 A | | 11/1988 | Steiner |
| 4,939,986 A | | 7/1990 | Turner |
| 5,060,901 A | | 10/1991 | Lathrop |
| 5,065,585 A | | 11/1991 | Wylie |
| 5,741,180 A | | 4/1998 | Xia |
| 5,881,806 A | | 3/1999 | Rudd |
| 5,989,119 A | | 11/1999 | Raisanen |
| 6,071,189 A | | 6/2000 | Blalock |
| 6,533,656 B2 | | 3/2003 | Hertel |
| 6,749,125 B1 | | 6/2004 | Carson |
| 6,752,713 B2 | | 6/2004 | Johnson, Jr. |
| 6,802,770 B2 | | 10/2004 | Larson |
| 6,979,169 B2 | | 12/2005 | Penlesky |
| 7,044,397 B2 | | 5/2006 | Bartlett |
| 7,128,303 B2 | | 10/2006 | Penlesky |
| 7,284,382 B2 | | 10/2007 | Wong |
| 7,398,821 B2 | | 7/2008 | Rainer |
| 7,455,500 B2 | | 11/2008 | Penlesky |
| 7,475,828 B2 | | 1/2009 | Bartlett |
| 7,497,774 B2 | | 3/2009 | Stevenson |
| 7,731,477 B2 | | 6/2010 | Erni |
| 7,774,102 B2 | | 8/2010 | Butler |
| 8,165,719 B2 | | 4/2012 | Kinney |
| 8,543,244 B2 | | 9/2013 | Keeling |
| 8,550,368 B2 | | 10/2013 | Butler |
| 8,562,283 B2 | | 10/2013 | Hopkins |
| 8,564,148 B1 | | 10/2013 | Novak |
| 8,791,587 B2 | | 7/2014 | Smith, Jr. |
| 9,261,290 B2 | | 2/2016 | Storm |
| 9,322,568 B2 | | 4/2016 | Aycock |
| 9,338,810 B2 | | 5/2016 | Erickson |
| 9,383,115 B2 | | 7/2016 | Siegel |
| 9,796,239 B2 | | 10/2017 | Connell |
| 10,072,860 B2 | | 9/2018 | Richards |
| 10,619,872 B2 | | 4/2020 | Mills |
| 10,760,802 B2 | | 9/2020 | Mills |
| 11,092,350 B1 | | 8/2021 | Stevenson |
| 11,193,687 B2 | | 12/2021 | Stevenson |
| 11,274,839 B1 | | 3/2022 | Stevenson |
| 12,152,794 B2 | * | 11/2024 | Mills ........................ F24F 8/22 |
| 2002/0112409 A1 | | 8/2002 | Knowles |
| 2005/0076655 A1 | | 4/2005 | Wong |
| 2005/0156052 A1 | | 7/2005 | Bartlett |
| 2006/0158051 A1 | | 7/2006 | Bartlett |
| 2007/0145160 A1 | | 6/2007 | Martin |
| 2008/0096482 A1 | | 4/2008 | Wettergren |
| 2009/0013703 A1 | | 1/2009 | Werner |
| 2009/0186570 A1 | | 7/2009 | Riggins |
| 2011/0151766 A1 | | 6/2011 | Sherman |
| 2011/0223850 A1 | | 9/2011 | Narayanamurthy |
| 2013/0166075 A1 | | 6/2013 | Castillo |
| 2013/0180700 A1 | | 7/2013 | Aycock |
| 2013/0244563 A1 | | 9/2013 | Noteboom |
| 2013/0289772 A1 | * | 10/2013 | Friedrich ............... G05B 13/02 700/291 |
| 2014/0206278 A1 | | 7/2014 | Stevenson |
| 2014/0242898 A1 | | 8/2014 | Richards |
| 2014/0333072 A1 | | 11/2014 | Smith |
| 2016/0054016 A1 | | 2/2016 | Takahashi |
| 2017/0363309 A1 | * | 12/2017 | Mills ....................... F24F 13/14 |
| 2020/0011555 A1 | | 1/2020 | Mills |
| 2020/0333036 A1 | | 10/2020 | Patel |
| 2020/0393152 A1 | * | 12/2020 | Ramirez .................. F24F 11/80 |
| 2021/0156582 A1 | | 5/2021 | Stevenson |
| 2021/0231325 A1 | | 7/2021 | Stevenson |
| 2021/0348791 A1 | | 11/2021 | Stevenson |
| 2022/0057099 A1 | * | 2/2022 | Clement ................... F24F 8/22 |
| 2022/0082285 A1 | | 3/2022 | Stevenson |
| 2022/0196265 A1 | | 6/2022 | Stevenson |
| 2023/0152767 A1 | * | 5/2023 | Baldwin ............... H04W 76/10 700/276 |

FOREIGN PATENT DOCUMENTS

| | | |
|---|---|---|
| WO | WO/2012/048184 | 4/2012 |
| WO | WO/2018/018989 | 2/2018 |
| WO | WO/2021/102022 | 5/2021 |
| WO | WO/2022/017335 | 1/2022 |

* cited by examiner

APPARATUS AND METHOD FOR PROVIDING A CLOUD CONTROLLED, GRID OPTIMIZING SELECTIVE FILTERED FRESH AIR SOURCE USING EXISTING OR NEW DUCTING

PRIORITY PATENT APPLICATIONS

This non-provisional continuation-in-part (CIP) patent application draws priority from U.S. non-provisional patent application Ser. No. 17/855,070; filed Jun. 30, 2022; which draws priority from U.S. provisional patent application Ser. No. 63/289,770; filed Dec. 15, 2021. This present non-provisional CIP patent application draws priority from the referenced patent applications. The entire disclosure of the referenced patent applications is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the disclosure provided herein and to the drawings that form a part of this document: Copyright 2019-2022, CentraVent, LLC; All Rights Reserved.

TECHNICAL FIELD

The disclosed subject matter relates to the field of heating, cooling, ventilating, and Carbon Monoxide (CO)/Refrigerant Gas detection equipment for structures, and particularly although not exclusively, to an apparatus and method for providing a cloud controlled, grid optimizing selective alternative cooling & filtered fresh air source using existing or new ducting, along with operations to seal and power off Heating, Ventilating, and Air Conditioning (HVAC) equipment if CO/Refrigerant Gas is detected and flush the structure with filtered fresh air.

BACKGROUND

Heating and cooling the space in residential and commercial buildings accounts for a primary share of building energy consumption. Existing buildings use either an air conditioning system or a whole house fan for cooling and ventilating residential and commercial building structures. Traditional air conditioning systems function by altering the temperature and humidity of the air and then pumping the treated air throughout the structure. The thermostat powers on the air conditioner until the structure reaches a set point temperature. While effective at conditioning the air, such traditional air conditioning systems are costly to run and not energy efficient. Additionally, when the outside ambient air temperature is lower than the internal air temperature, outside ambient air could instead be used to effectively cool the structure, reducing the need to run a costly air conditioning system. Further, air conditioning systems merely circulate air located within a building, and do not bring any outside air, so any harmful environmental elements (e.g. dust, disease, CO/Refrigerant gas, chemicals, etc.) remain within the building.

In response to such problems, some structures instead use whole house fans to force air through the structure. Whole house fans consist of one or more exhaust fans, typically placed in the attic or an upper floor, and function by creating a negative pressure inside of the structure to draw cooler air in from the outside. The cooler outside air is forced up through the ceiling into the attic where the air is exhausted out through a vent. Louvered shutters are often placed over the vent to prevent cooled or heated air from escaping when the fan is not in use. However, these louvers do not fully prevent the air, insulation or debris from entering the home. Whole house systems move large amounts of air and allow for the entire structure air volume to be recycled with multiple air exchanges per hour, removing latent heat within the structure. Traditional whole house fans are installed on the attic floor such that they directly contact the ceiling of the structure. As such, the large capacity whole house fans, necessary to create sufficient negative pressure to draw the cooler air inside in the structure, can create undesirable noise and vibrations that penetrate the occupied space of the building. Advantageously, these systems require less energy than air conditioning systems and can reduce the need for air conditioning and therefore reduce structure energy consumption while still providing a comfortable space. However, such whole house fans require open windows or doors to serve as intake air vents. Thus, the user is required to manually control the air flow. The opened windows or doors, however, can allow in dust, pollen, and other pollutants from the exterior incoming air. The opened windows or doors can also create security problems for the owner. There are also many CO/Refrigerant detectors on the market today that will alert the user of the detection of poisonous gas; however, none of them are linked with the HVAC allowing them to shut off the source of the leak and flush the structure with fresh filtered air. Thus, a better alternative whole house cooling, filtered fresh air system is needed that does not require open windows or doors.

Additionally, normal commercial buildings and residential homes are operating everyday with high amounts of energy stealing appliances (e.g., HVAC, vehicle charging stations, lights, etc.). America has made it their goal to get to zero carbon by the year 2050. There have been many new products and concepts created in order to make it possible to reach that goal—solar, and wind turbines being two of the great green products to get us there. However, these green products can be inconsistent at times in the generation of energy. We need to be able to lessen the load on the power grid during peak times of the day when the demand on the grid is at its highest and solar generation capacity has reached its peak ability to provide clean energy. Using currently available conventional technology, high loads on the grid are serviced by causing dirty grid energy providers to kick into gear to provide enough energy for the high demand.

SUMMARY

As disclosed herein, the Filtered Fresh Air Ventilation system, which is disclosed and claimed in various embodiments in U.S. non-provisional patent application Ser. No. 17/855,070, and designated in the figures included herewith with reference number 100. As disclosed herein, the term CVT CF refers to a Central Ventilation and CentraFlow system, which is disclosed and claimed in various embodiments in U.S. non-provisional patent application Ser. No. 17/855,070, and designated in the figures included herewith with reference number 101. As disclosed herein, the term CVT GCF refers to a Central Ventilation and Green Cooling Fan system, which is disclosed and claimed in various embodiments in U.S. Pat. No. 10,619,872, and designated in the figures included herewith with reference number 148. As disclosed herein, the term CVT FFC refers to a Central Ventilation and Filtered Free Cooling system, which is disclosed and claimed in various embodiments in U.S. Pat. No. 10,760,802, and designated in the figures included herewith with reference number 92. As disclosed herein, the term CVT CB refers to a Central Ventilation and Control Board system, which is designated in the figures included herewith with reference number 145. As disclosed herein, the term CVT App refers to a Central Ventilation and Software Application system, which is designated in the figures included herewith with reference number 160. As disclosed herein, the term CVT WI-FI PNP refers to a Central Ventilation Wi-Fi Plug-n-Play outlet/plug adaptor, which is designated in the figures herein with reference number 153.

According to various example embodiments of the disclosed subject matter as described herein, there is disclosed, illustrated, and claimed an apparatus and method for providing a selective fresh air source using existing or new ducting, along with operations to seal and power off HVAC equipment if CO/Refrigerant Gas is detected and flush the structure with fresh filtered air. The example embodiments disclosed herein provide an apparatus, system, and method implemented as a whole house filtered fresh air ventilation system. With reference to the drawings provided herewith, example embodiments of the disclosed whole house filtered fresh air ventilation system 100 can utilize the CVT CF 101 and the HVAC (heating, ventilating, and air conditioning) supply vents in the ceiling or floors or the CVT FFC to bring in outdoor fresh filtered air for a whole house fan, thereby eliminating the need to open a door or window for fresh air. Additionally, for indoor environmental safety measures, a Carbon Monoxide/Refrigerant gas detector is mounted in the CVT CF transition/plenum box 134 or 150. If CO or Refrigerant gas is detected, a signal is sent to the CVT CB 145 and CVT App 160, immediately shutting off the HVAC Furnace/Air Handler 120 system and turning on the CVT CF 101. This will damper off the HVAC Furnace/Air Handler 120 and evaporative coil 122, open the dampers to the outside filtered fresh air, and (in tandem) turn on the CVT GCF 148 or existing whole house fan, flushing out the interior of the structure. The CVT App 160 will prompt the user to alert emergency services, keeping the occupants of the structure safe and eliminating the threat of CO or refrigerant gas poisoning. The CVT App 160 will also prompt the user to contact a service technician to advise them of the alert.

The CVT CF 101 of various example embodiments (denoted with reference numbers 130-145,149-153) can be equipped with three separate air dampers that can be installed between the HVAC, Furnace 120, Evaporative coil 122, and the HVAC air supply plenum 110 or CVT CF transition/plenum 134 or 150, also in the ducting leading to the outside air intake. The air damper types mentioned in the embodiments are; a dual position rolling damper, a dual position flag damper and an optional round duct damper, however, there are many known and unknown dampers that could also work to accomplish the same goal of sealing off or dampening off the specific openings. The CVT CF 101 of an example embodiment can utilize its own supply transition/plenum 150 or an existing HVAC supply plenum 110 and supply ducting 112 of a standard HVAC system to distribute filtered fresh outdoor air throughout a building space using new or existing air ducting in the building, along with a CO/Refrigerant gas detector. The CVT CF 101 communicates with the CVT CB 145 and the CVT App 160. The CVT CF 101 of an example embodiment can work in conjunction with most whole house fan systems on the market today. If installing with an existing whole house fan, the existing whole house fan will need to be plugged into the CVT Wi-Fi PNP 153 in order to gain access to the CVT App 160. Optimally, to create the CVT GCS 100, the CVT CF 101 should be installed with a CVT GCF 148, to access all features.

An alternative feature of the Filtered Fresh Air Ventilation System 100 of various example embodiments, can include a CVT CF 101 with an additional dual position actuated duct damper 170 coupled to a flush or duct mounted ventilation fan 171 working in tandem with the CVT FFC 92 to flush the structure with filtered fresh air through the HVAC supply ducts 112 into the attic.

Additionally, the Filtered Fresh Air Ventilation System 100 of various example embodiments can be configured as the Central Ventilation Green Cooling System (CVT GCS 70), which includes alternative cooling whole-house filtered fresh air ventilation apparatuses with smart HVAC control through an internet cloud 72 connected and power grid 78 optimizing solution. The various example embodiments of the CVT GCS 70 disclosed herein can include apparatus for commercial or residential fresh air ventilation managed with hardware and software to electronically control and connect the apparatus to the internet cloud 72 and the power grid 78. The CVT GCS 70 can be configured to interface with artificial intelligence (AI) systems, Internet of Things (IOT) systems, smart thermostat systems 75, grid data systems and cloud services. The various example embodiments of the CVT GCS 70 provide a whole house filtered fresh air ventilation apparatus including a software solution to manage data from data services including power grid intensity, grid demand, energy usage savings, weather, and in-house information including temperature, humidity, Carbon Monoxide detection, refrigerant gas detection, and movement detection. The CVT GCS 70 disclosed herein enables fully automated alternative cooling and ventilation of a home or business via web connected devices. The CVT GCS 70 provides a whole house filtered fresh air ventilation apparatus controlling access to filtered outside air, efficient flushing of inside air, constant low pressure fresh air and smart electrical control of heat pumps and heating, ventilating, and air conditioning (HVAC) systems to optimize carbon intensity of the home or business and to utilize the data services and in-house IOT information to optimize the use of renewable resources on premises and on the power grid. Example embodiments are described in more detail below.

BRIEF DESCRIPTION OF THE DRAWINGS

Embodiments are illustrated by way of example and not limitation in the figures of the accompanying drawings, in which.

DETAILED DESCRIPTION

Figure 1:
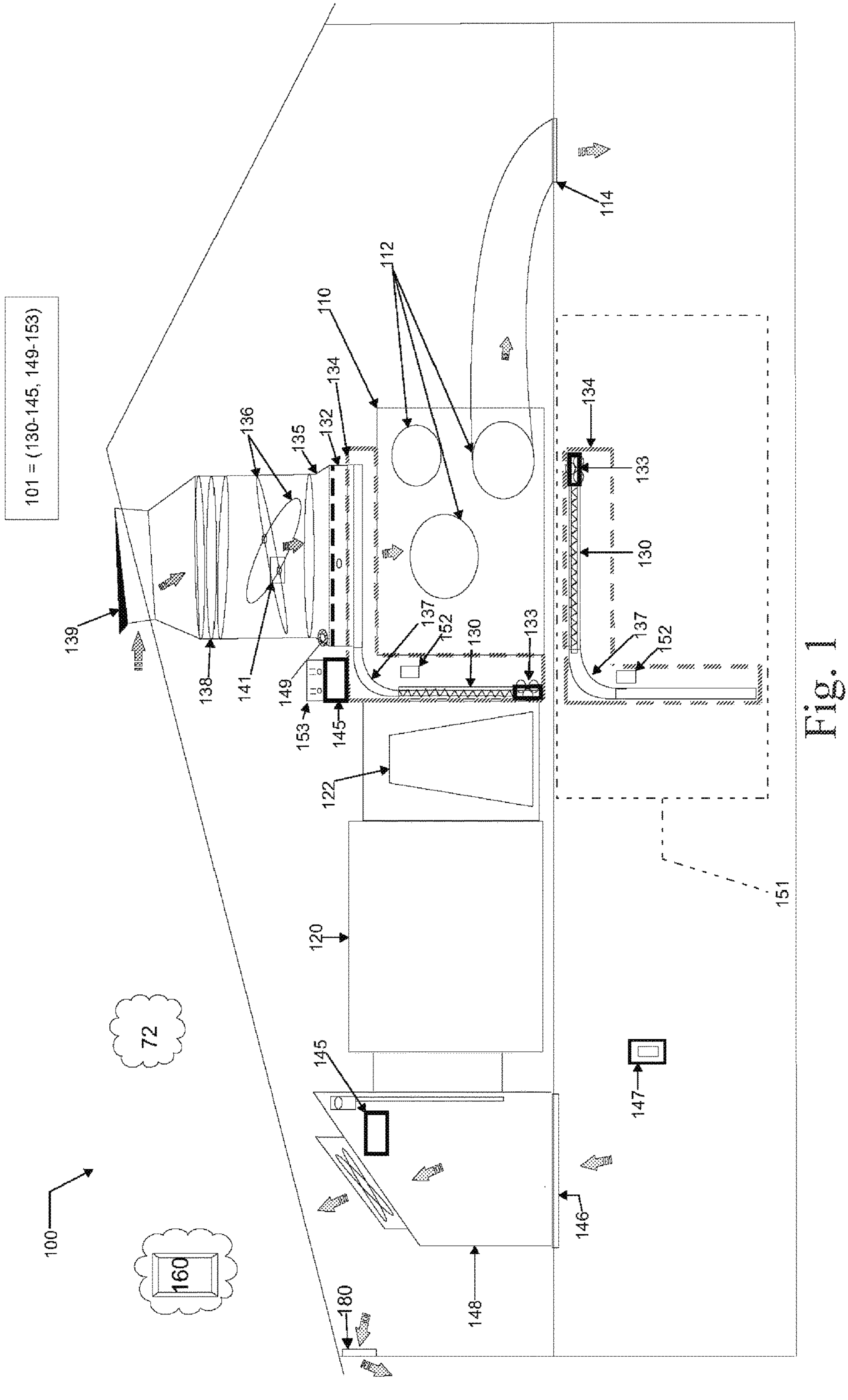
FIG. 1 illustrates an example embodiment with an "L" shaped transition box with a rolling damper between the HVAC evaporative coil/air handler and the HVAC plenum supply box.

In the following detailed description, reference is made to the accompanying drawings that form a part hereof, and in which are shown, by way of illustration, specific embodiments in which the disclosed subject matter can be practiced. It is understood that other embodiments may be utilized, and structural changes may be made without departing from the scope of the disclosed subject matter.

According to various example embodiments of the disclosed subject matter as described herein, there is disclosed, illustrated, and claimed an apparatus and method for providing a cloud controlled, grid optimizing selective alternative cooling filtered fresh air source using existing or new ducting, along with operations to seal and power off existing HVAC equipment while the filtered fresh air ventilation system 100 is running. The filtered fresh air ventilation system 100 disclosed herein also has the ability to automatically turn on the CVT GCF 148 or existing whole house fan and at the same time the CVT CF 101 seals and powers off HVAC equipment if CO/Refrigerant Gas is detected, then flushes the structure with filtered fresh air. The filtered fresh air ventilation system 100 of example embodiments disclosed herein provides an apparatus, system, and method implemented as an alternative cooling filtered fresh air system. Example embodiments of the disclosed filtered fresh air ventilation system 100 can utilize the CVT CF 101 and the HVAC (heating, ventilating, and air conditioning) supply vents in the ceiling or floors to access outdoor filtered fresh air for a CVT GCF 148 or existing whole house fan, thereby eliminating the need to open a door or window for fresh air while the Filtered fresh air system is running. The CVT CB 145 and the CVT App 160 can communicate with an existing thermostat or smart thermostat in the structure to give operation choices or updates to the user. The CVT CB 145 is configured to work with the example embodiments CVT CF 101, the CVT GCF 148, the CVT App 160, and CVT FFC 92. If the CVT CF 101 is installed with a whole house fan other than the CVT GCF 148, then it will connect to the CVT CB 145 and the existing whole house fan will connect to the CVT WI-FI PNP 153. This CVT WI-FI PNP 153 allows access to the CVT App 160 with limited functionality.

The CVT CB 145 has software and safeties that protect the HVAC/furnace/evaporative coil system, preventing the HVAC/furnace 120 from running at the same time as the CVT GCF 148 and CVT CF 101. The CVT App 160 can communicate with the CVT CB 145, the CVT Wall Switch 147, the CVT WI-FI PNP 153 and smart thermostats to set schedules, read outdoor and indoor temperatures to determine if and when it is energy efficient to run. It can control the speed of the CVT GCF 148. When using the CVT WI-FI PNP 153 (due to connecting to an existing whole house fan rather than the CVT GCF 148), the CVT App 160 will have limited functions and will not control the speed of some existing whole house fan motors. It can show the user charts or statistics of energy consumption along with checking the indoor air quality.

A CO/Refrigerant gas detector 152 is coupled to the transition/plenum box 134 or 150, which communicates with the CVT CB 145 and the CVT App 160. If it detects CO or Refrigerant gas in the transition box or plenum, a signal will be sent to the CVT CB 145 and the CVT App 160. Then the CVT CF 101 and the CVT GCF 148, will turn both on immediately, which will seal and power off the HVAC/furnace/evaporative coil, isolating the threat until a repair or alert is cleared. The CVT App 160 will alert the user and will prompt the user with an option to contact emergency services and or a service company to respond to the alert. These Internet of Things (IOT) features will learn and operate automatically or manually, while giving updates and information to the user.

The CVT CF 101 of various example embodiments can be equipped with two separate air dampers. One that can be installed between the HVAC evaporative coil/air handler and HVAC air supply vents throughout the home. The second optional duct damper can be installed in the large fresh air flex duct (This is backup to sealing off incoming fresh air from the low-profile roof vent or gable vent). The CVT CF 101 of an example embodiment can utilize the supply plenum and supply ducting of a standard HVAC system to distribute filtered fresh outdoor air throughout the building space using the air ducting throughout the building. The CVT CF 101 of an example embodiment can work in conjunction with most whole house fan systems on the market today. However, to have the optimal filtered fresh air ventilation 100 experience, the CVT CF 101 of various example embodiments should be coupled with the CVT GCF 148.

FIGS. 1 through 6 illustrate example embodiments of the components of the disclosed apparatus for providing a selective filtered fresh air source using existing or new ducting, along with CVT CB 145, an optional Wi-Fi wall switch 147, optional CVT WI-FI PNP 153, CVT App 160, and operations to seal and power off the HVAC equipment if CO/Refrigerant Gas is detected and operations to flush the structure with fresh filtered air.

Figure 2:
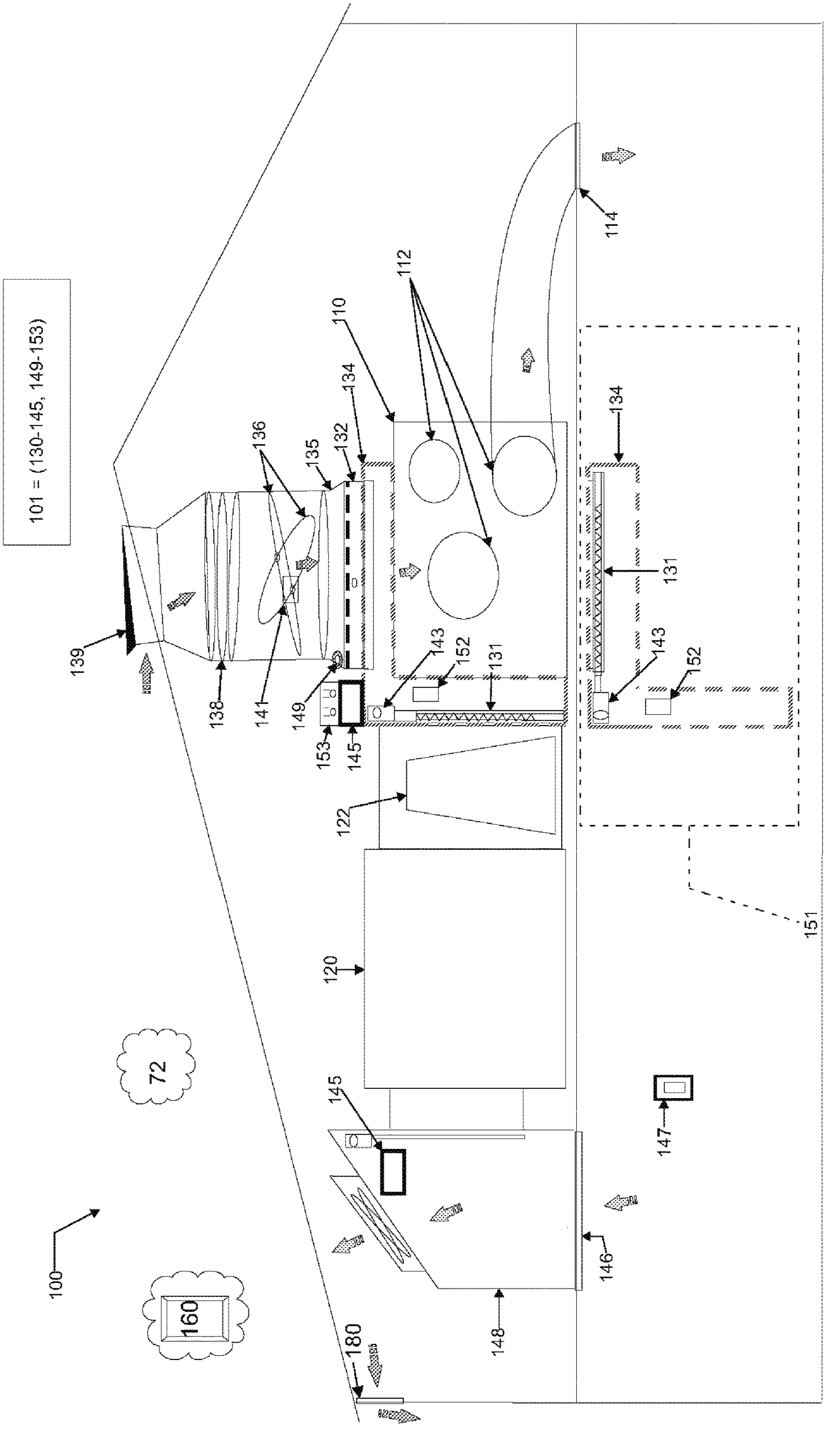
FIG. 2 illustrates an example embodiment with the "L" shaped transition box with a flag damper between the HVAC evaporative coil/air handler and the HVAC plenum supply box.
Figure 3:
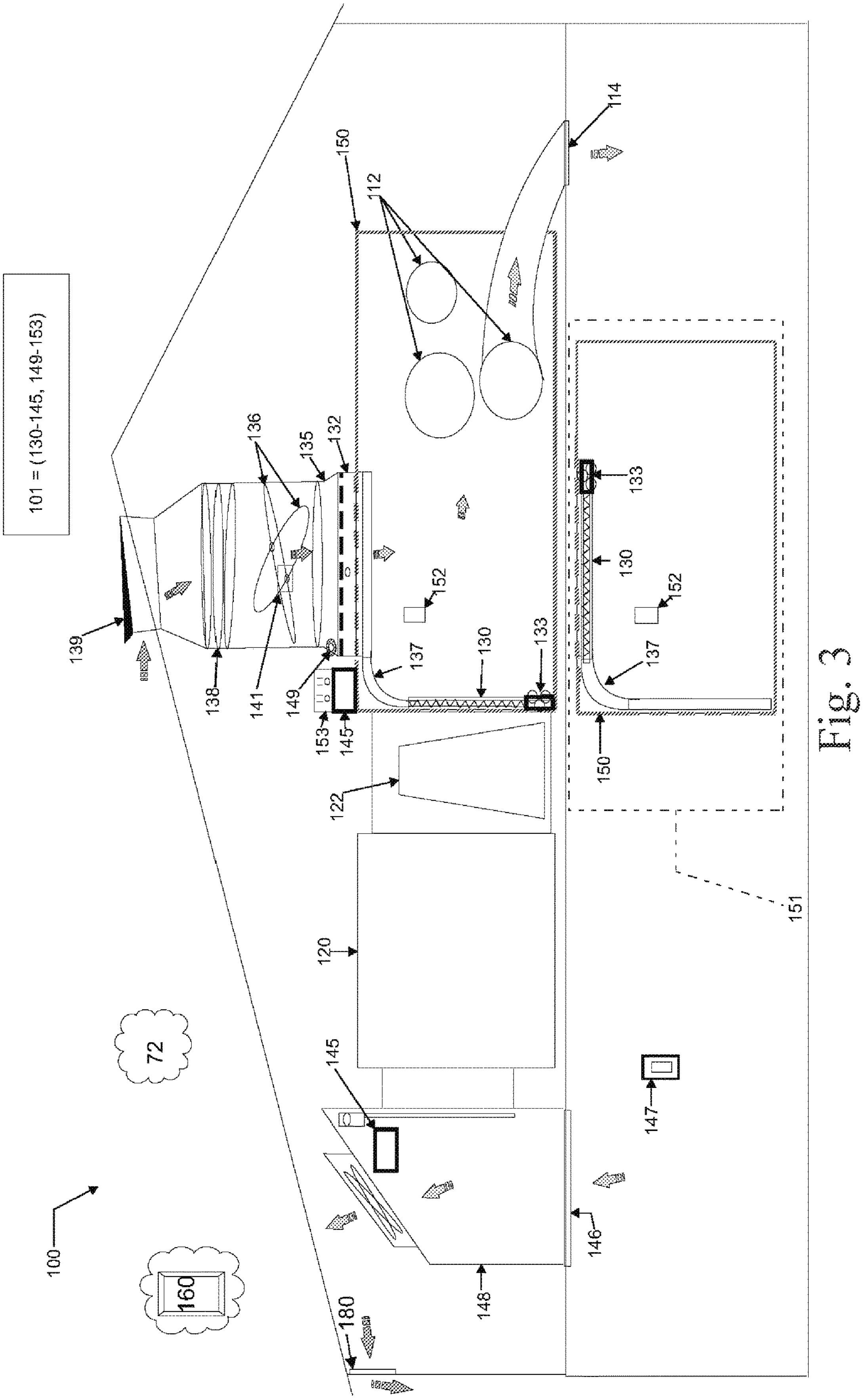
FIG. 3 illustrates an example embodiment with a transition/plenum box with the rolling damper between the HVAC evaporative coil/air handler and the HVAC supply ducts.
Figure 4:
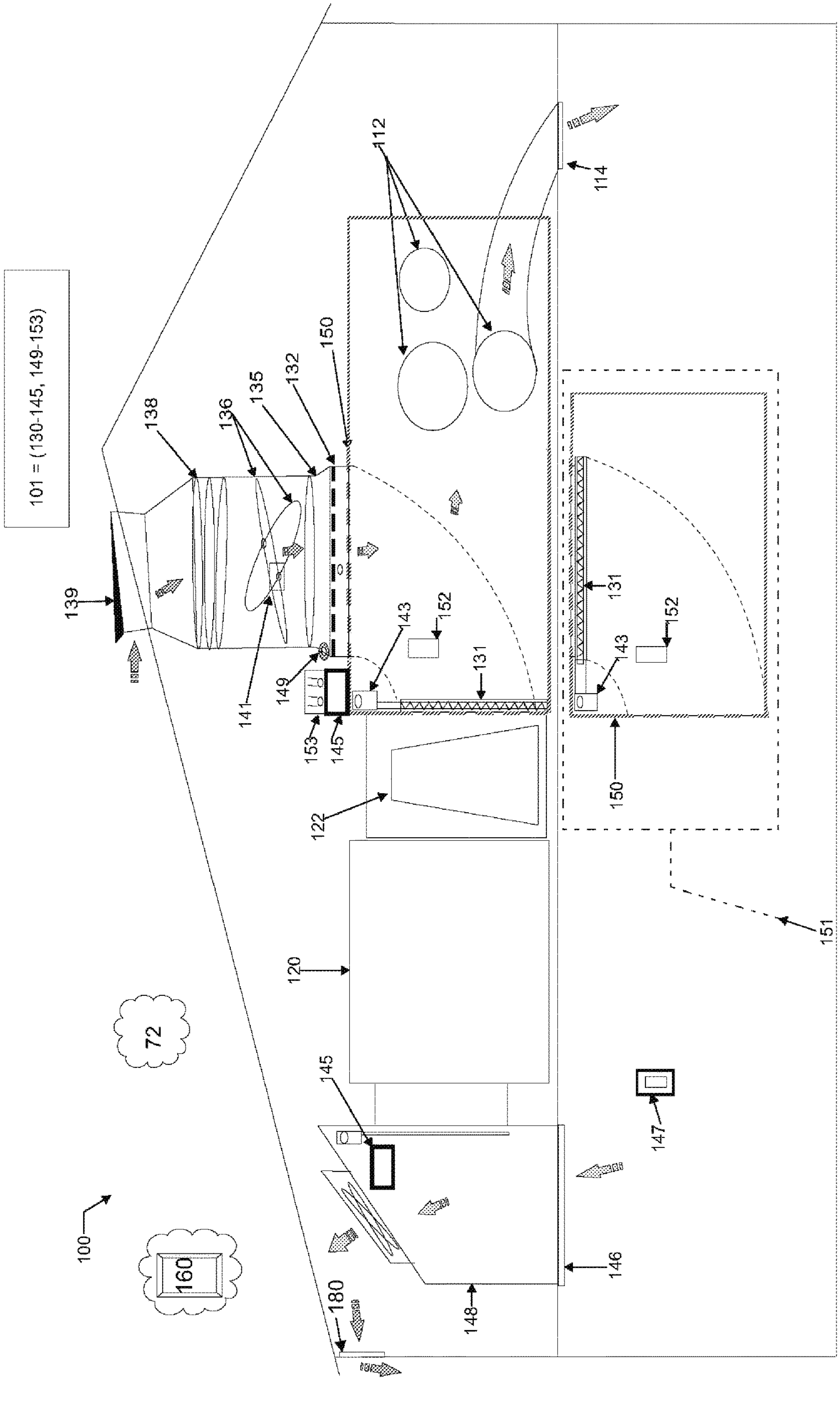
FIG. 4 illustrates an example embodiment with a transition/plenum box with the flag damper between the HVAC evaporative coil/air handler and the HVAC supply ducts.
Figure 5:
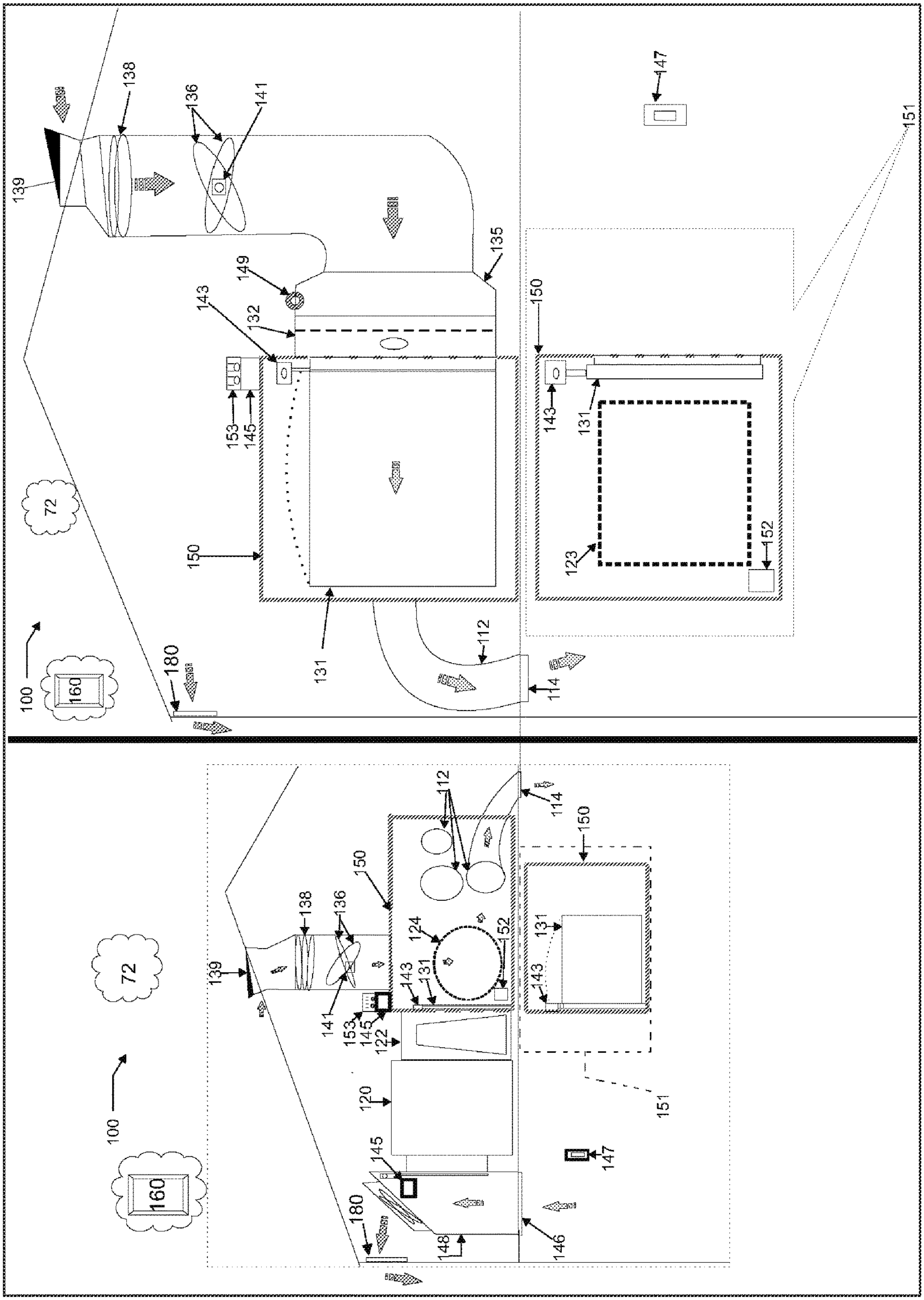
FIG. 5 illustrates a large side view and a small frontal view of example embodiments with a transition/plenum box coupled to a side mounted filter box and a side mounted flag damper between the HVAC evaporative coil/air handler and the HVAC plenum supply ducts.
Figure 6:
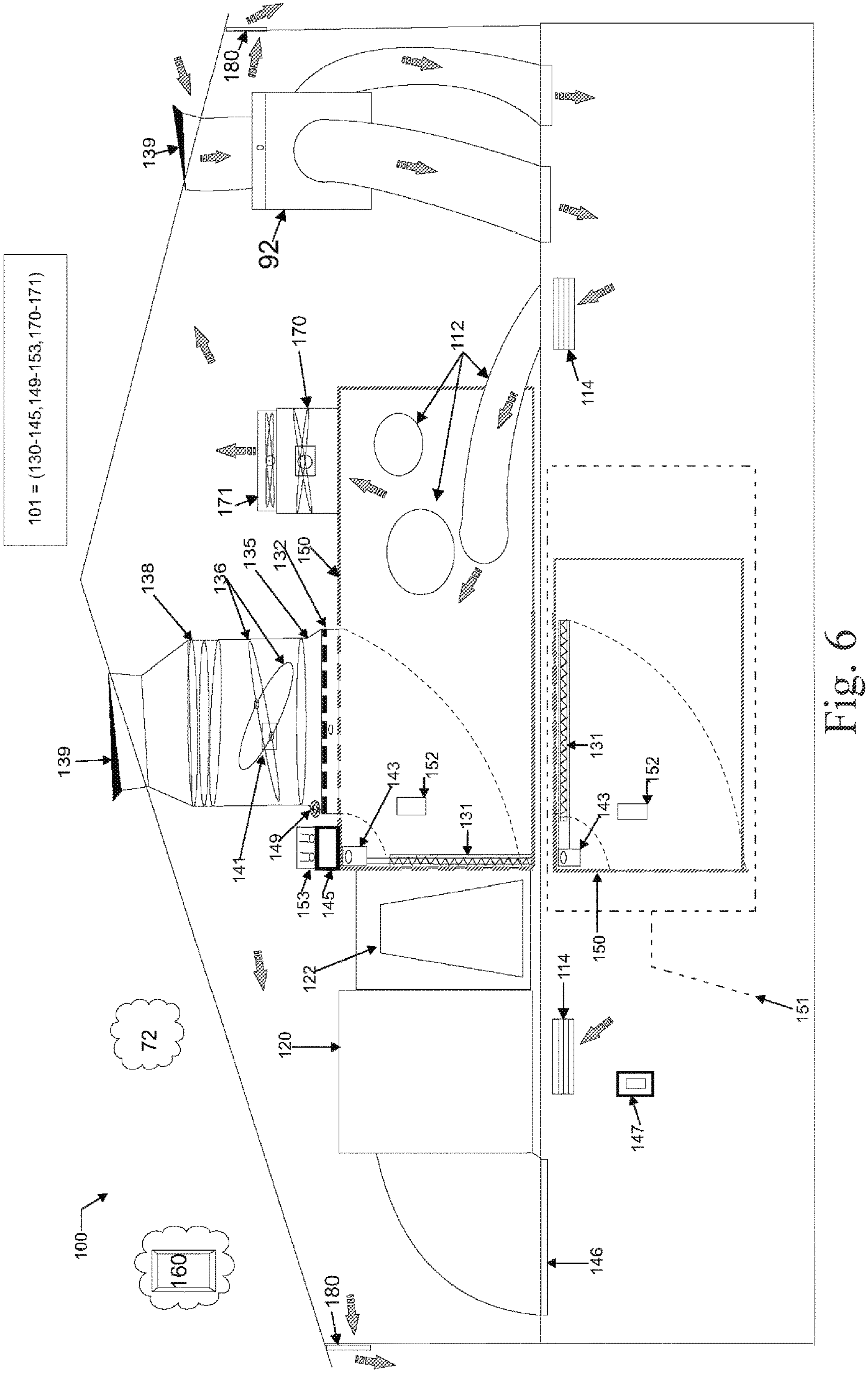
FIG. 6 illustrates an example embodiment with an actuated duct damper and flush mount or duct mounted selective fan utilizing the new or existing supply ducts.

FIG. 1 illustrates an example embodiment of the Filtered Fresh Air Ventilation System 100 and the CVT CF 101 utilizing an "L" shaped transition box with a dual position rolling damper installed between the HVAC evaporative coil and the existing HVAC plenum supply box. FIG. 2 illustrates an example embodiment of the CVT CF 101 utilizing an "L" shaped transition box with a dual position flag damper installed between the existing HVAC evaporative coil and the existing HVAC plenum supply box. FIG. 3 illustrates an example embodiment of the CVT CF 101 utilizing a transition/plenum box with a dual position rolling damper installed between the HVAC evaporative coil/air handler and the HVAC supply ducts. FIG. 4 illustrates an example embodiment of the CVT CF 101 utilizing a transition/plenum box with a dual position flag damper installed between the HVAC evaporative coil and the HVAC supply ducts. FIG. 5 illustrates a large side view and a small frontal view example embodiments with a transition/plenum box coupled to a side mounted filter box and a side mounted dual position flag damper installed between the HVAC evaporative coil/air handler and the HVAC supply ducts. Although this view features a side mounted dual position flag damper, this application could also be installed with a side mounted dual position rolling damper, track, and rolling actuator. FIG. 6 illustrates a view of the example embodiments disclosed herein, which can utilize new or the already existing duct supplies that the majority of structure/homes already have. FIG. 6 illustrates a configuration of the CVT CF 101, with a actuated duct damper 170 attached to the CVT CF transition/plenum box 150 coupled with a flush mount or duct mounted selective fan 171, while dampening/sealing off the HVAC/furnace/air handler 120 and evaporative coil 122. The ducted damper remains closed, while interacting in tandem with the CVT FFC 92 to bring filtered fresh air into the interior of the structure. The CVT CF 101 selective fan 171 pulls the filtered fresh air through the supply vents, through the supply ducts, through the open actuated damper and through the selective fan into the attic where it is expelled through the gable or roof vents.

Referring again to FIG. 1, a Filtered Fresh Air Ventilation System 100 in an example embodiment with the CVT CF 101 is shown when it is in the active "On" position. FIG. 1 shows the CVT CB 145 twice. This is not a mistake; it is an option. If the install of the CVT CF 101 is coupled to the CVT GCF 148 then the CVT CF 101 will couple to the CVT CB 145 that is already attached to the CVT GCF 148. However, if the CVT CF 101 is installed independently, it will couple to its own CVT CB 145 that will be attached to the top of the transition/plenum box. Only one CB is needed to run the CVT CF 101 and Filtered Fresh Air Ventilation System 100.

In the event that the CVT CF 101 is installed independently with an existing whole house fan other than the CVT GCF 148, then CVT CF 101 will couple to the CVT CB 145 that can be installed on the "L" shaped transition box 134. The existing whole house fan will couple to the CVT WI-FI PNP 153 and communicate through the CVT App 160. The CVT CF 101 can be controlled by the optional Wi-Fi wall switch 147, and or the CVT App 160.

The Filtered Fresh Air Ventilation System 100 works in tandem with the activation or "On" position of the CVT CF 101. In this case, the CVT GCF 148 or existing whole house fan will pull outside air through the CVT CF 101. The activation of the rolling damper actuator 133 will cause the dual position rolling damper 130 to move down, along the damper track 137 from a closed position to an open position inside the "L" shaped transition box 134. This seals off the access to the HVAC evaporative coil/air handler 122 and HVAC Furnace/Air Handler 120 and opens the access to the existing HVAC plenum 110 and interior of the home/structure. At the same time, the optional actuator 141 will move the optional round duct damper 136 to non-horizontal (e.g., from a closed to an open position), thereby allowing outside fresh air to be pulled through the low-profile roof vent or gable vent 139, through the large flex duct 138, and past the optional duct damper 136. The air passes by optional UV light 149, and through a filter box 132 where a filter is installed. Because the CVT CF 101 is in the "On" position and the dual position rolling damper 130 is blocking the evaporative coil/air handler 122, the filtered fresh air can freely enter the "L" shaped transition box chamber 134. The air is pulled past a CO/Refrigerant gas detector 152, then the filtered fresh air enters through the existing HVAC plenum supply box 110, through all the HVAC supply ducts 112, and through the supply vents 114. Now that the filtered fresh air is in the home/structure, the air will either be pulled through the ceiling return 146, and CVT GCF 148 and into the attic cooling it off OR if they do not have a CVT GCF 148, then the filtered fresh air can be pulled through another brand of existing whole house fan. The arrows indicate the flow of outside air being pulled through the CVT CF 101 and circulating the interior air out through the CVT GCF 148 or existing whole house fan into the attic and out through the gable, eaves or roof vents 180. (Existing whole house fans are not illustrated in the figures.)

The portion of FIG. 1 identified by the callout 151 shows an alternate view of the dual position rolling damper in the closed "Off" position (closing off the outside filtered fresh air) and opening the path to the HVAC evaporative coil 122. This position allows for normal function of the HVAC Furnace/Air Handler system 120.

The Filtered Fresh Air Ventilation System 100 as disclosed herein can augment the HVAC system to add additional components to effect the selective sourcing of filtered fresh air using the ducting of the HVAC Furnace/Air Handler system 120.

Referring now to FIG. 2, the Filtered Fresh Air Ventilation System 100 in an example embodiment with the CVT CF 101 is shown when it is in the active "On" position. FIG. 2 shows the CVT CB 145 twice. This is not a mistake; it is an option. If the install of the CVT CF 101 is coupled to the CVT GCF 148 then the CVT CF 101 will couple to the CVT CB 145 that is already attached to the CVT GCF 148. However, if the CVT CF 101 is installed independently, it will couple to its own CVT CB 145 that will be attached to the top of the transition/plenum box. Only one CB is needed to run the CVT CF 101 and Filtered Fresh Air Ventilation System 100.

In the event that the CVT CF 101 is installed independently with an existing whole house fan other than the CVT GCF 148, then Filtered Fresh Air System 100 will couple to the CVT CB 145 that can be installed on the "L" shaped transition box 134. The existing whole house fan will couple to the CVT WI-FI PNP 153, and communicate through the CVT App 160. The CVT CF 101 can be controlled by the optional Wi-Fi wall switch 147, and or the CVT App 160.

The Filtered Fresh Air Ventilation System 100 works in tandem with the activation or "On" position of the CVT CF 101. In this case, the CVT GCF 148 or existing whole house fan will pull outside air through the CVT CF 101. The activation of the damper actuator 143 will cause the dual position flag damper 131 to move down from a closed position to an open position inside the "L" shaped transition box 134. This seals off the access to the HVAC evaporative coil/air handler 122 and HVAC Furnace/Air Handler 120 and opens the access to the existing HVAC plenum 110 and interior of the home/structure. At the same time, the optional actuator 141 will move the optional round duct damper 136 to non-horizontal (e.g., from a closed to an open position), thereby allowing outside fresh air to be pulled through the low-profile roof vent or gable vent 139, through the large flex duct 138, and past the optional duct damper 136. The air passes by optional UV light 149, through a filter box 132 where a filter is installed. Because the CVT CF 101 is in the "On" position and the dual position flag damper 131 is blocking the evaporative coil/air handler 122, the filtered fresh air can freely enter the "L" shaped transition box 134 chamber. The air is pulled past a CO/Refrigerant gas detector 152. Then, the filtered fresh air enters through the existing HVAC plenum supply box 110, through all the existing HVAC supply ducts 112, and through the supply vents 114. Once the filtered fresh air is in the home/structure, the air will either be pulled through the ceiling return 146, and CVT GCF 148 and into the attic cooling it off OR if they do not have a CVT GCF 148, then the filtered fresh air can be pulled through another brand of whole house fan. The arrows indicate the flow of outside air being pulled through the CVT CF 101 and circulating the interior air out through the CVT GCF 148 or existing whole house fan into the attic and out through the roof or attic vents 180. (Existing whole house fans are not illustrated in the figures.)

The portion of FIG. 2 identified by the callout 151 shows an alternate view of the dual position flag damper in the closed "Off" position (closing off the outside filtered fresh air) and opening the path to the HVAC evaporative coil 122. This position allows for normal function of the HVAC Furnace/Air Handler system 120.

The Filtered Fresh Air Ventilation System 100 as disclosed herein can augment the HVAC system to add additional components to effect the selective sourcing of filtered fresh air using the ducting of the HVAC Furnace/Air Handler system 120.

Referring now to FIG. 3, the Filtered Fresh Air Ventilation System 100 in an example embodiment with the CVT CF 101 is shown when it is in the active "On" position. FIG. 3 shows the CVT CB 145 twice. This is not a mistake; it is an option. If the install of the CVT CF 101 is coupled to the CVT GCF 148 then the CVT CF 101 will couple to the CVT CB 145 that is already attached to the CVT GCF 148. However, if the CVT CF 101 is installed independently, it will couple to its own CVT CB 145 that will be attached to the top of the transition/plenum box. Only one CB is needed to run the CVT CF 101 and Filtered Fresh Air Ventilation System 100.

In the event that the CVT CF 101 is installed independently with a whole house fan other than the CVT GCF 148, then CVT CF 101 will couple to the CVT CB 145 that can be installed on the transition/plenum box 150. The existing whole house fan will couple to the CVT WI-FI PNP 153 and communicate through the CVT App 160. The CVT CF 101 can be controlled by the optional Wi-Fi wall switch 147, and or the CVT App 160.

The Filtered Fresh Air Ventilation System 100 works in tandem with the activation or "On" position of the CVT CF 101. In this case, the CVT GCF 148 or existing whole house fan will pull outside air through the CVT CF 101. The activation of the rolling damper actuator 133 will cause the dual position rolling damper 130 to move down, along the damper track 137 from a closed position to an open position inside the transition/plenum box 150. This seals off the access to the HVAC evaporative coil/air handler 122 and HVAC Furnace/Air Handler 120 and opens the access to the HVAC supply ducts 112 and interior of the home/structure. At the same time, the optional actuator 141 will move the optional round duct damper 136 to non-horizontal (e.g., from a closed to an open position), thereby allowing outside fresh air to be pulled through the low-profile roof vent or gable vent 139, through the large flex duct 138, and past the optional duct damper 136. Air passes by optional UV light 149, through a filter box 132 where a filter is installed. Because the CVT CF 101 is in the "On" position and the dual position rolling damper 130 is blocking the evaporative coil 122, the filtered fresh air can freely enter the transition/plenum box 150. The air is pulled past a CO/Refrigerant gas detector 152, then the filtered fresh air enters through the transition/plenum 150, through the HVAC supply ducts 112, through the existing supply vents 114. Once the filtered fresh air is in the home/structure, the air will either be pulled through the ceiling return 146, and CVT GCF 148 and into the attic cooling it off OR if they do not have a CVT GCF 148, then the filtered fresh air can be pulled through another brand of whole house fan. The arrows indicate the flow of outside air being pulled through the CVT CF 101 and circulating the interior air out through the CVT GCF 148 or existing whole house fan. (Existing whole house fans are not illustrated in the figures.)

The portion of FIG. 3 identified by the callout 151 shows an alternate view of the dual position rolling damper in the closed "Off" position (closing off the outside filtered fresh air) and opening the path to the HVAC evaporative coil/air handler 122. This position allows for normal function of the HVAC Furnace/Air Handler system 120.

The Filtered Fresh Air Ventilation System 100 as disclosed herein can augment the HVAC system to add additional components to effect the selective sourcing of filtered fresh air using the ducting of the HVAC Furnace/Air Handler system 120.

Referring now to FIG. 4, the Filtered Fresh Air Ventilation System 100 in an example embodiment with the CVT CF 101 is shown when it is in the active "On" position. FIG. 4 shows the CVT CB 145 twice. This is not a mistake; it is an option. If the install of the CVT CF 101 is coupled to the CVT GCF 148 then the CVT CF 101 will couple to the CVT CB 145 that is already attached to the CVT GCF 148. However, if the CVT CF 101 is installed independently, it will couple to its own CVT CB 145 that will be attached to the top of the transition/plenum box. Only one CB is needed to run the CVT CF 101 and Filtered Fresh Air Ventilation System 100.

In the event that CVT CF 101 is installed independently with a whole house fan other than the CVT GCF 148, then CVT CF 101 will couple to the CVT CB 145 that can be installed on the transition/plenum box 150. The existing whole house fan will couple to the CVT WI-FI PNP 153, and communicate through the CVT App 160. The CVT CF 101 can be controlled by the optional Wi-Fi wall switch 147, and or the CVT App 160.

The Filtered Fresh Air Ventilation System 100 works in tandem with the activation or "On" position of the CVT CF 101. In this case, the CVT GCF 148 or existing whole house fan will pull outside air through the CVT CF 101. The activation of the actuator 143 will cause the dual position flag damper 131 to move down from a closed position to an open position inside the transition/plenum box 150. This seals off the access to the HVAC evaporative coil 122 and HVAC Furnace/Air Handler 120 and opens the access to the HVAC supply ducts 112 and interior of the home/structure. At the same time, the optional actuator 141 will move the optional round duct damper 136 to non-horizontal (e.g., from a closed to an open position), thereby allowing outside fresh air to be pulled through the low-profile roof vent or gable vent 139, through the large flex duct 138, past the optional duct damper 136, air passes by optional UV light 149, through a filter box 132 where a filter is installed. Now, since the CVT CF 101 is in the "On" position and the dual position flag damper 131 is blocking of the evaporative coil 122, the filtered fresh air can freely enter the transition/plenum box 150. The air is pulled past a CO/Refrigerant gas detector 152, then the filtered fresh air enters through the HVAC supply ducts 112, through the supply vents 114. Once the filtered fresh air is in the home/structure, the air will either be pulled through the ceiling return 146, and CVT GCF 148 and into the attic cooling it off OR if they do not have a CVT GCF 148, then the filtered fresh air can be pulled through another brand of whole house fan. The arrows indicate the flow of outside air being pulled through the CVT CF 101 and circulating the interior air out through the CVT GCF 148 or existing whole house fan into the attic and out through the gable, eaves or vents 180. (Existing whole house fans are not illustrated in the figures.)

The portion of FIG. 4 identified by the callout 151 shows an alternate view of the dual position flag damper in the closed "Off" position (closing off the outside filtered fresh air) and opening the path to the HVAC evaporative coil 122. This position allows for normal function of the HVAC Furnace/Air Handler system 120.

The Filtered Fresh Air Ventilation System 100 as disclosed herein can augment the existing HVAC system to add additional components to effect the selective sourcing of filtered fresh air using the ducting of the HVAC Furnace/Air Handler system 120.

Referring now to FIG. 5, the Filtered Fresh Air Ventilation System 100 in an example embodiment with the CVT CF 101 is shown when it is in the active "On" position. FIG. 5 includes two views: on the right, a large side view, and on the left a smaller frontal view (to visualize how the ducting is mounted to the side of the transition/plenum box 150). On the upper right side of FIG. 5, the Filtered Fresh Air Ventilation System 100 and the large side view of the CVT CF 101 is shown. This side view of the transition/plenum box 150 shows the side mounted dual position damper 131 in the open or "On" position (closing off the evaporative coil/air handler 122, not shown in FIG.) and opening up to the transition/plenum box 150 and supply ducts 112.

On the upper left side of FIG. 5, the Filtered Fresh Air Ventilation System 100 and the small frontal view of the CVT CF 101 is shown. This frontal view of the transition/plenum box 150 shows the side mounted dual position damper 131 in the open or "On" position (closing off the evaporative coil 122) and opening up the path 124 to the HVAC supply ducts 112 and the existing supply vents 114 throughout the home/structure.

FIG. 5 also shows the CVT CB 145 control board once on the upper right large side view and twice on the upper left small side view. This is not a mistake; it is an option. If the install of the CVT CF 101 is coupled to the CVT GCF 148 then the CVT CF 101 will couple to the CVT CB 145 that is already attached to the CVT GCF 148. However, if the CVT CF 101 is installed independently, it will couple to its own CVT CB 145 that will be attached to the top of the transition/plenum box. Only one CB is needed in each view to run the CVT CF 101 and Filtered Fresh Air Ventilation System 100.

In the event that the CVT CF 101 is installed independently with a whole house fan other than the CVT GCF 148, then CVT CF 101 will couple to the CVT CB 145 that can be installed on the transition/plenum box 150. The existing whole house fan will couple to the CVT WI-FI PNP 153, and communicate through the CVT App 160. The CVT CF 101 can be controlled by the optional Wi-Fi wall switch 147, and or the CVT App 160.

The Filtered Fresh Air Ventilation System 100 works in tandem with the activation or "On" position of the CVT CF 101. In this case, the CVT GCF 148 or existing whole house fan will pull outside air through the CVT CF 101. The activation of the actuator 143 will cause the dual position flag damper 131 to move down from a closed position to an open position inside the transition/plenum box 150. This seals off the access to the HVAC evaporative coil 122 and HVAC Furnace/Air Handler 120 and opens the access to the HVAC supply ducts 112 and interior of the home/structure. At the same time, the optional actuator 141 will move the optional round duct damper 136 to non-horizontal (e.g., from a closed to an open position), thereby allowing outside fresh air to be pulled through the low-profile roof vent or gable vent 139, through the large flex duct 138, past the optional duct damper 136, air passes by optional UV light 149, through a filter box 132 where a filter is installed. Now, since the CVT CF 101 is in the "On" position and the dual position flag damper 131 is blocking the evaporative coil 122, the filtered fresh air can freely enter the transition/plenum box 150. The air is pulled past a CO/Refrigerant gas detector 152, then the filtered fresh air enters through the transition/plenum box 150, through all the HVAC supply ducts 112, through the HVAC supply vents 114. Once the filtered fresh air is in the home/structure, the air will either be pulled through the ceiling return 146, and CVT GCF 148 and into the attic cooling it off OR if they do not have a CVT GCF 148, then the filtered fresh air can be pulled through another brand of whole house fan. The arrows indicate the flow of outside air being pulled through the CVT CF 101 and circulating the interior air out through the CVT GCF 148 or existing whole house fan into the attic and out through the gable, eaves or roof vents 180. (Existing whole house fans are not illustrated in the figures.)

The Filtered Fresh Air Ventilation System 100 as disclosed herein can augment the HVAC system to add additional components to effect the selective sourcing of filtered fresh air using the ducting of the HVAC Furnace/Air Handler system 120.

Referring again to FIG. 1, the Filtered Fresh Air Ventilation System 100 is shown when the CVT CF 101 is "Off" (callout 151 inactive). In this case, the dual position rolling damper 130 can be moved up into a closed position by a rolling actuator 133, on a curved track 137. In the "Off" position, the dual position rolling damper 130 closes off the filter box 132 from the "L" shaped transition box 134, which blocks off the outside air. The optional round duct damper 136 is moved into a closed position (non-vertical) by the optional actuator 141. In this closed position, the outside air is sealed off from the flex duct 138 and the low-profile outside air roof vent or gable vent 139 preventing outside air from entering the home/structure.

When the CVT CF 101 is "Off" (callout 151 inactive), the evaporative coil/air handler 122 and HVAC Furnace/Air Handler 120 are open to the "L" shaped transition box 134 and plenum supply box 110, supply ducts 112 and supply vents 114 into the interior of the home/structure allowing for normal HVAC use.

Referring again to FIG. 2, the Filtered Fresh Air Ventilation System 100 is shown when the CVT CF 101 is "Off" (callout 151 inactive). In this case, the dual position flag damper 131 can be moved up into a closed position by an actuator 143. In the "Off" position, the dual position flag damper 131 closes off the filter box 132 from the "L" shaped transition box 134, which blocks off the outside air. The optional round duct damper 136 is moved into a closed position (non-vertical) by the optional actuator 141. In this closed position, the outside air is sealed off from the flex duct 138 and the low-profile outside air roof vent or gable vent 139 preventing outside air from entering the home/structure.

When the CVT CF 101 is "Off" (callout 151 inactive), the evaporative coil 122 and HVAC Furnace/Air Handler 120 are open to the "L" shaped transition box 134 and plenum supply box 110, supply ducts 112 and supply vents 114 into the interior of the home/structure allowing for normal HVAC use.

Referring again to FIG. 3, the Filtered Fresh Air Ventilation System 100 is shown when the CVT CF 101 is "Off" (callout 151 inactive). In this case, the dual position rolling damper 130 can be moved up into a closed position by a rolling actuator 133, on a curved track 137. In the "Off" position, the dual position rolling damper 130 closes off the filter box 132 from the transition/plenum box 150, which blocks off the outside air. The optional round duct damper 136 is moved into a closed position (non-vertical) by the optional actuator 141. In this closed position, the outside air is sealed off from the flex duct 138 and the low-profile outside air roof vent or gable vent 139 preventing outside air from entering the home/structure.

When the CVT CF 101 is "Off" (callout 151 inactive), the evaporative coil/air handler 122 and HVAC Furnace/Air Handler 120 are open to the transition/plenum box 150, supply ducts 112 and supply vents 114 into the interior of the home/structure allowing for normal HVAC use.

Referring again to FIG. 4, the Filtered Fresh Air Ventilation System 100 is shown when the CVT CF 101 is "Off" (callout 151 inactive). In this case, the dual position flag damper 131 can be moved up into a closed position by an actuator 143. In the "Off" position, the dual position flag damper 131 closes off the filter box 132 from the transition/plenum box 150, which blocks off the outside air. The optional round duct damper 136 is moved into a closed position (non-vertical) by the optional actuator 141. In this closed position, the outside air is sealed off from the flex duct 138 and the low-profile outside air roof vent or gable vent 139 preventing outside air from entering the home/structure.

When the CVT CF 101 is "Off" (callout 151 inactive), the evaporative coil 122 and HVAC Furnace/Air Handler 120 are open to the transition/plenum box 150, supply ducts 112 and supply vents 114 into the interior of the home/structure allowing for normal HVAC use.

Referring again to FIG. 5, the Filtered Fresh Air Ventilation System 100 is shown in the large side view when the CVT CF 101 is "Off" (callout 151 inactive) or when it is in the inactive "Off" position. FIG. 5 includes two views: on the right, a large side view, and on the left a smaller frontal view (to visualize how the ducting is mounted to the side of the transition/plenum box 150). Though not pictured in the FIG. 5, this same application can be configured with a side mounted rolling damper and rolling actuator on a curved damper track.

On the lower right side of FIG. 5, the Filtered Fresh Air Ventilation System 100 is shown in the large side view with the CVT CF 101. In this case, the callout 151 is an alternate view of the side mounted flag damper 131 in the closed or "Off" position (closing off the outside filtered fresh air). The side mounted flag damper 131 is sealed against the filter box 132 allowing an open path 123 to the HVAC/furnace 120 and evaporative coil/air handler 122. This "Off" position allows for normal function of the HVAC Furnace/Air Handler system 120.

On the lower left side of FIG. 5, the Filtered Fresh Air Ventilation System 100 is shown in the small view with the CVT CF 101. In this case, the callout 151 is an alternate view of the side mounted flag damper 131 in the closed or "Off" position (closing off the outside filtered fresh air). The side mounted flag damper 131 is sealed against the path 124 (shown directly above) and filter box 132. This "Off" position opens up the path to the HVAC Furnace/Air Handler 120 and evaporative coil 122. This "Off" position allows for normal function of the HVAC system.

Referring again to FIG. 6, the Filtered Fresh Air Ventilation System 100 of the example embodiments disclosed herein, can utilize new or the already existing duct supplies 112 that the majority of structure/homes already have. The example embodiments disclosed herein provide a configuration of the CVT CF 101, with an actuated duct damper 170 attached to the CVT CF transition/plenum box 150 coupled with a flush mount or duct mounted selective fan 171, while dampening/sealing off the HVAC/furnace/air handler 120 and evaporative coil 122. The ducted damper 136 remains closed, while interacting in tandem with the CVT FFC 92 to bring filtered fresh air into the interior of the structure. The CVT CF 101 selective fan 171 pulls the filtered fresh air through the supply vents 114, through the supply ducts 112, through the open actuated duct damper 170 and through the selective fan 171 into the attic where it is expelled through the gable, eaves or roof vents 180.

Referring still to FIG. 6 the Filtered Fresh Air Ventilation System 100 of the example embodiments disclosed herein, the CVT CB 145, and CVT APP 160 or optional Wi-Fi Wall switch 147 can be activated into the ON or active position. The actuated duct damper 136/145 will remain closed, while the damper actuator 131/143 seals off the HVAC/furnace/air handler 120 and evaporative coil 122. At the same time, the actuated duct damper 170 and the CVT FFC 92 will open up. After a time delay, the flush mounted or duct mounted selective fan 171 will turn on drawing the fresh outside air through the CVT FFC 92 (which filters the fresh outside air), into the interior of the structure (flushing the interior), through the new or existing HVAC supply vents 114, through the new or existing HVAC supply ducts 112, into the CVT CF 101 transition/plenum box 150, through the actuated duct damper 170 and flush mount or ducted selective fan 171. Air pushes through the attic and out the gable, eaves or roof vents 180. This configuration eliminates the need to open windows or doors. The CVT Wi-Fi PNP 153 can be utilized as an additional power source.

The Filtered Fresh Air Ventilation System 100 of the example embodiments disclosed herein, can utilize new or the already existing ductwork that the majority of structure/homes already have. The CVT CF 101 will also filter the outside fresh air before the air enters the transition/plenum boxes 134 or 150. The CVT CF 101 of the example embodiments fits between HVAC evaporative coils/air handler 122 and the HVAC supply ducts 112. These transition/plenum boxes 134 and 150 are placed in front of the coil 122 to prevent and protect the coil 122 from debris.

With the Filtered Fresh Air Ventilation System 100, there will be no need to open windows or doors when turning on any whole house fans. This means the user can operate the system with the CVT App 160 when they are away from their home. The user can keep their home closed up and their alarm system on while controlling everything with their CVT App 160. As a result, the Filtered Fresh Air Ventilation System 100 of the example embodiments makes every home more secure, cleaner, and more energy efficient. The Filtered Fresh Air Ventilation System 100 of the example embodiments can include a CVT App 160, CVT CB 145, an optional Wi-Fi wall switch 147, and an optional CVT WI-FI PNP 153. The CVT App 160 can be interfaced with an existing smart thermostat. The CVT CB 145 can communicate independently with the CVT CF 101, or be combined with the CVT GCF 148, CVT FFC and or the CVT WI-FI PNP 153 (that an existing whole house fan can plug into).

The CVT App 160, which can be implemented as executable software on a standard smartphone, mobile device, desktop computer, or laptop computer, can be configured to do many things. For example, the CVT App 160 has a Wi-Fi connection to communicate/update to other IOT platform/logic/smart thermostats multiple brands, variable switches, manual switches both known and unknown. The CVT App 160 can be set up with logins/passwords with several users and allow for user restrictions. The CVT App 160 can set up multiple CVT CF's 101, CVT GCF's 148 and CVT FFC's 92 in different parts of the structure/home. The CVT App 160 can turn On/Off CVT GCF 148 and/or existing whole house fans (e.g., when the existing WHF is connected to the CVT WI-FI PNP). The CVT App 160 can turn On/Off CVT CF 101 and or CVT FFC 92. The CVT App 160 can integrate with the CVT FFC 92. This will allow access to parts of the home without HVAC supply ducts or for extra filtered fresh air needed to accommodate the cfm (airflow in cubic feet per minute) of selective fans or whole house fan. The CVT App 160 can be voice activated through different platform logic both known and unknown. The CVT App 160 can set schedules/run times/time zones. The CVT App 160 can show the user the energy use on graphs and reports.

The CVT App 160 can be interfaced with the Filtered Fresh Air Ventilation System 100, the CVT CB 145, and/or smart thermostats. All the HVAC 24*v* control wiring goes through the CVT CB 145 to communicate and control the operations of the HVAC 120. The CVT CB 145 and the CVT App 160 can pull local weather and indoor temperatures. This allows the user to set the Filtered Fresh Air Ventilation System 100 to turn on when it identifies the user's set points for the ideal indoor temperature. These set points will be based on when the ideal current outside temperature is cooler than the inside temperature of a home/structure in which an HVAC unit and Filtered Fresh Air Ventilation System 100 are installed. In this case, the CVT App 160 can be configured or send alerts to the user to deactivate the HVAC unit and energize or activate the Filtered Fresh Air Ventilation System 100 and the CVT FFC 92 as described above. In this manner, the CVT CF 101 disclosed herein and the CVT GCF 148 or existing whole house fan system with the CVT FFC 92 can cool a structure with filtered fresh air at a fraction of the cost relative to operation of the HVAC system. These set points will keep the system from turning on if the outside weather is too hot or too cold. This IOT App can learn and operate with other ecosystem logic and or devices. These functions are only available when connected to the CVT CB 145.

The CVT App 160 can send alerts if the CO/Refrigerant gas detector 152 senses CO or Refrigerant gas in the home/structure. In this case, the HVAC system will be shut off and the CVT CF 101 will turn on automatically, along with the CVT GCF 148 or existing whole house fan, to flush the CO or Refrigerant gas out of the structure. The CVT App 160 will alert the user and prompt them with options to contact emergency services and or a service company to respond to the alert. These functions are only available when connected to the CVT CB 145.

Safeties are configured into the software of the CVT CB 145 to ensure the HVAC system and the whole house fan system will not activate at the same time. Also, safety interlocks can be installed on dampers to prevent the CVT CF 101 and the CVT GCF 148 from running with the dampers in the wrong positions. Dampers can be configured with spring return safeties that will move dampers back to an off (inactive) position in the event of a power failure, ensuring normal HVAC function.

Figure 7A:
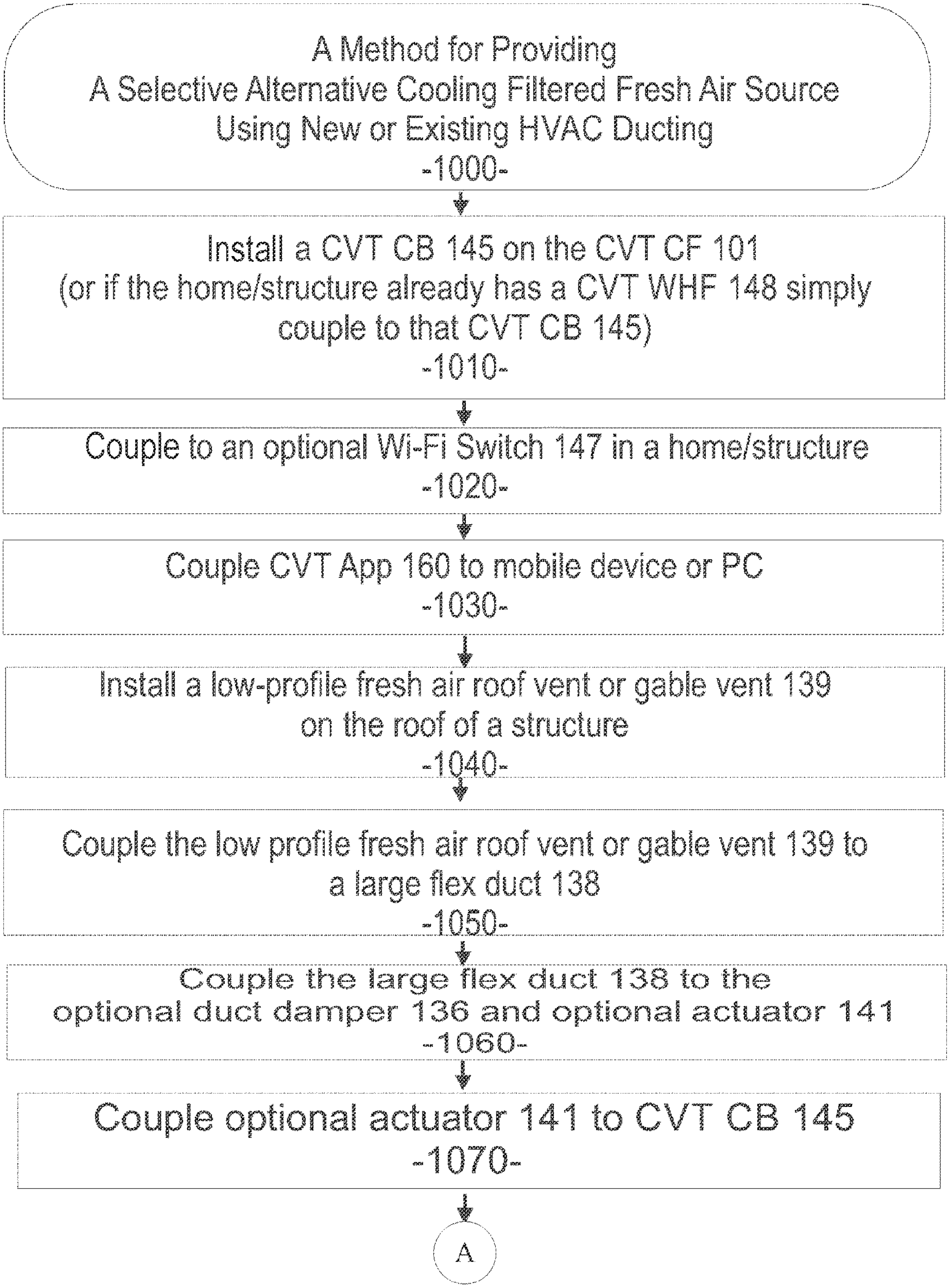
FIGS. 7A, 7B, 7C, and 8 illustrate flow diagrams representing sequences of operations performed in methods according to example embodiments.
Figure 7B:
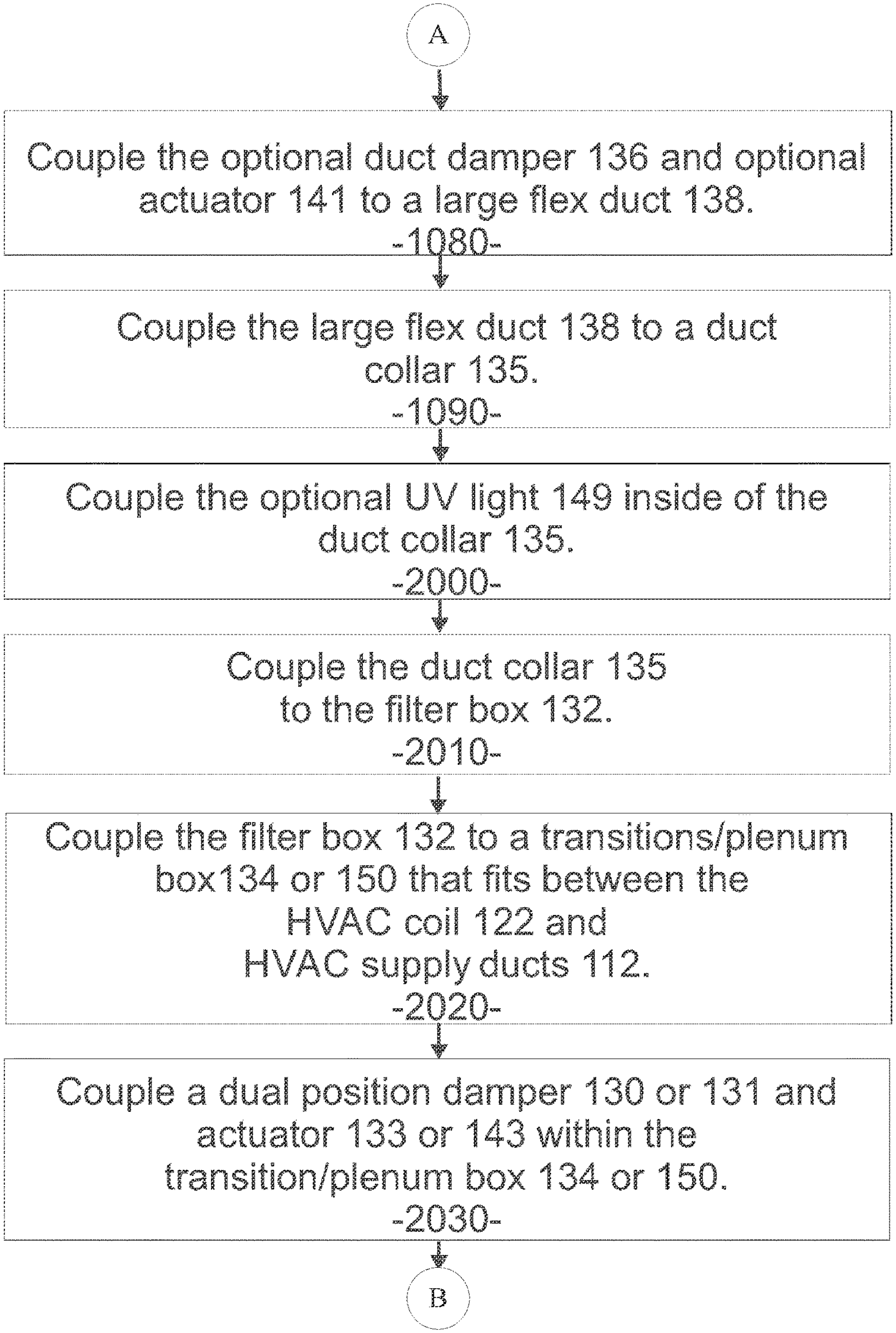
Figure 7C:
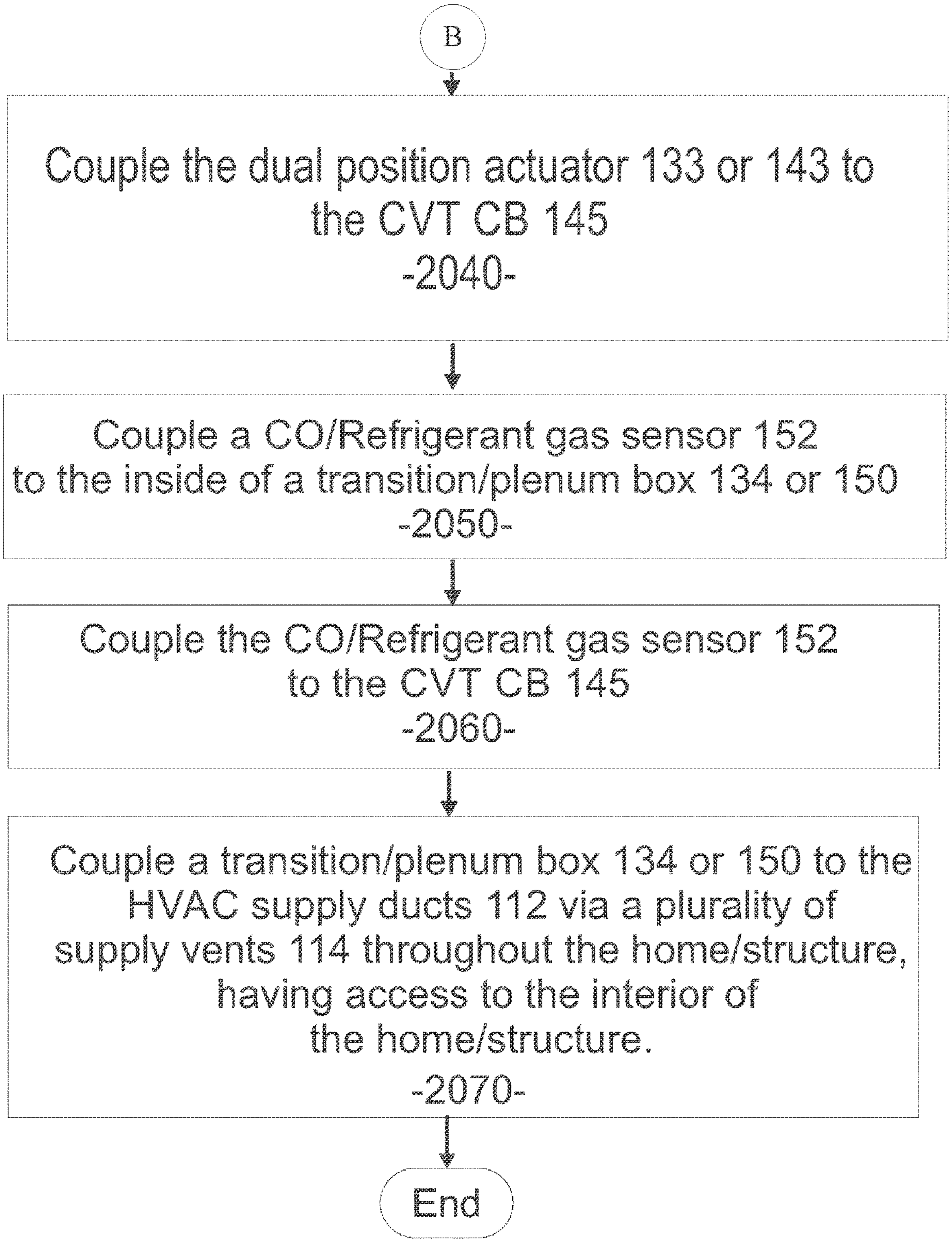

Referring to FIGS. 7A, 7B, and 7C, the figures illustrate flow diagrams representing a sequence of operations performed in a method according to an example embodiment. An example embodiment of a method includes: A Method for Providing A Selective Alternative Cooling Filtered Fresh Air Source Using New or Existing HVAC Ducting (Operation 1000); which includes Installing a CVT control board 145 on the CVT CentraFlow 101 (or if the home/structure already has a CVT GCF 148 simply couple the existing CVT CB 145 to the CVT CF 101) (Operation 1010); coupling to an optional Wi-Fi wall switch 147 in a home/structure (Operation 1020); coupling a CVT App 160 on mobile device or PC (Operation 1030); Installing a low-profile fresh air roof vent or gable vent 139 on the roof of a structure (Operation 1040); coupling the low-profile fresh air roof vent or gable vent 139 to a large flex duct 138 (Operation 1050); coupling a large flex duct 138 to an optional duct damper 136 and optional actuator 141 (Operation 1060); coupling optional actuator 141 to CVT CB 145 (Operation 1070); coupling the optional duct damper 136 and optional actuator 141 to a large flex duct 138 (Operation 1080); coupling the large flex duct 138 to a duct collar 135 (Operation 1090); coupling an optional UV light 149, (Operation 2000); coupling a duct collar 135 to a filter box 132 (Operation 2010); coupling a filter box 132 to a transition/plenum box 134 or 150 that fits between the HVAC evaporative coil/air handler 122 and HVAC supply ducts 112 (Operation 2020); coupling a dual position damper 130 or 131 and actuator 133 or 143 within the transition/plenum box 134 or 150 (Operation 2030); coupling the dual position actuator 133 or 143 to the CVT CB 145 (Operation 2040); coupling a CO/Refrigerant gas detector 152 to a transition/plenum box 134 or 150 (Operation 2050); coupling the CO/Refrigerant gas detector 152 to the CVT CB 145 (Operation 2060); and coupling a transition/plenum box 134 or 150 to the HVAC supply ducts 112 via a plurality of supply vents 114 throughout the home/structure, having access to the interior of the home/structure (Operation 2070).

Figure 8:
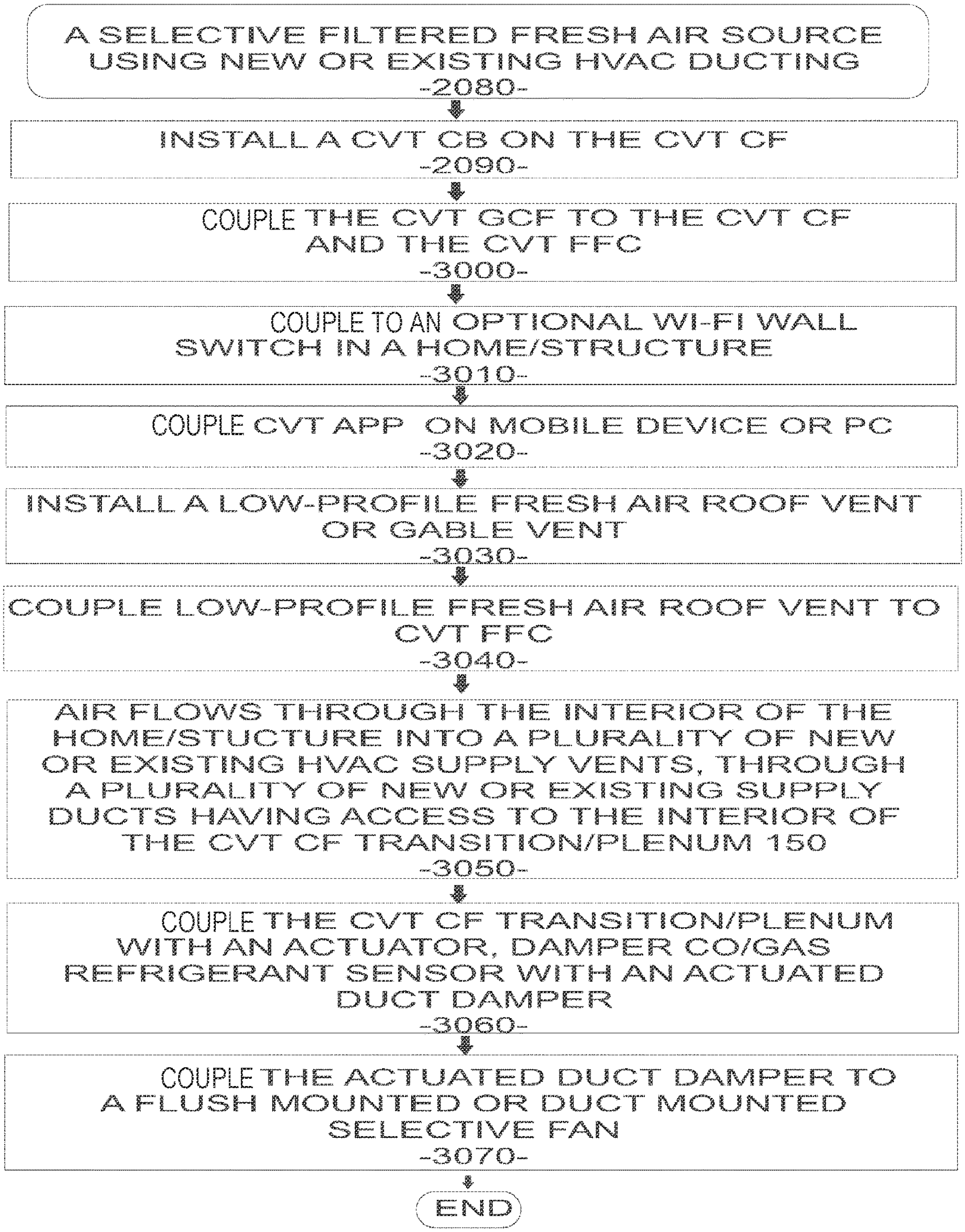

Referring to FIG. 8, the figure illustrates a flow diagram representing a sequence of operations performed in a method according to an example embodiment. The method of an example embodiment includes: A Method for Providing A Selective Filtered Fresh Air Source Using New or Existing HVAC Ducting (Operation 2080); which includes Installing a CVT control board 145 on the CVT CentraFlow 101 (Operation 2090), Coupling the CVT CB to the CVT CF 101 and the CVT FFC 92 (Operation 3000), coupling to an optional Wi-Fi wall switch 147 in a home/structure (Operation 3010); coupling the CVT App 160 on a mobile device or PC (Operation 3020); Installing a low-profile fresh air roof vent or gable vent 139 (Operation 3030); coupling the low-profile fresh air roof vent or gable vent 139 to the CVT FFC 92 (Operation 3040); causing air flows through the interior of the home/structure into a plurality of new or existing HVAC supply vents 114, through a plurality of new or existing HVAC supply ducts 112 having access to the interior of the CVT CF 101 transition/plenum box 150 (Operation 3050); coupling the CVT CF transition/plenum box 150 with an actuator 143, damper 131 and CO/Refrigerant gas sensor 152 with a actuated duct damper 170 (Operation 3060); and coupling the actuated duct damper 170 to a flush mounted or duct mounted selective fan 171 (Operation 3070).

The Central Ventilation Green Cooling System (CVT GCS) in Example Embodiments

The Central Ventilation Green Cooling System (CVT GCS) is a combination of a selective fan or vent cooling system installed in a structure of various example embodiments disclosed herein can be a combination of a whole house filtered fresh air ventilation system combined with a mobile device software application (CVT App), the selective fan or vent cooling system (CVT GCF) encompassed in the HVAC plenum, including a first controller the selective filtered fresh air sourcing systems the (CVT CF) encompassed in the HVAC plenum, and (CVT FFC), (CVT Wi-Fi PNP) including a second controller the control board (CVT CB) communicating and controlling the HVAC system, the thermostat and the optional Wi-Fi Wall Switch connected to the power grid through an internet cloud interface. In a particular embodiment, the whole house filtered fresh air ventilation system can be implemented as the system disclosed herein, or disclosed in U.S. Pat. No. 10,619,872 or U.S. Pat. No. 10,760,802. The control board of the CVT GCS can control the functions of the CVT GCF, CVT CF, CVT FFC, CVT Wi-Fi PNP, the HVAC system including a third controller the standard or smart thermostat, and an existing whole house fan system, the constant low pressure fresh air, and an optional wall switch. The control board can be connected to the power grid through an internet cloud interface. The CVT GCS can operate with AI and IOT technology, which will allow the CVT GCS to communicate with the power grid to determine the best time (depending on peak hours, solar power generation capability, weather, or CO/Refrigerant gas detection) to automatically or manually shut down the HVAC system and flush the structure with filtered fresh air without having to open doors or windows. The CVT GCS will allow the user to set parameters and schedules. Degree set points can be established to turn the CVT GCS on for optimal run times based on indoor temperature, or humidity versus current outdoor temperature.

Example 1: If the indoor humidity is too high, the CVT GCS will activate and seal/power off the HVAC, then flush the home with filtered fresh air.

Example 2: High and low outdoor temperatures are initially set so that the CVT GCS will not activate if it is too hot or too cold, then a second set point allow for a specific degree temperature spread between indoor temperature versus outdoor temperature. If the set point is a six-degree differential (or other configurable differential), then the CVT GCS will activate and seal/power off the HVAC system flushing the home with filtered fresh air.

When utilized during peak energy usage as an alternative cooling solution to the HVAC equipment, the CVT GCS can flatten the dirty grid energy curve when solar energy is no longer producing energy and save several kw (kilowatts) per day per household. The CVT GCS is essentially a DEG (Distributed Energy Generation) solution and can interface with DER 79 (Distributed Energy Resources) to create energy efficient environments and energy credits. Additionally, because the CVT GCS 70 pulls such low wattage, it is designed to run on backup generators when the power goes out, allowing for the alternative cooling solution.

Figure 9:
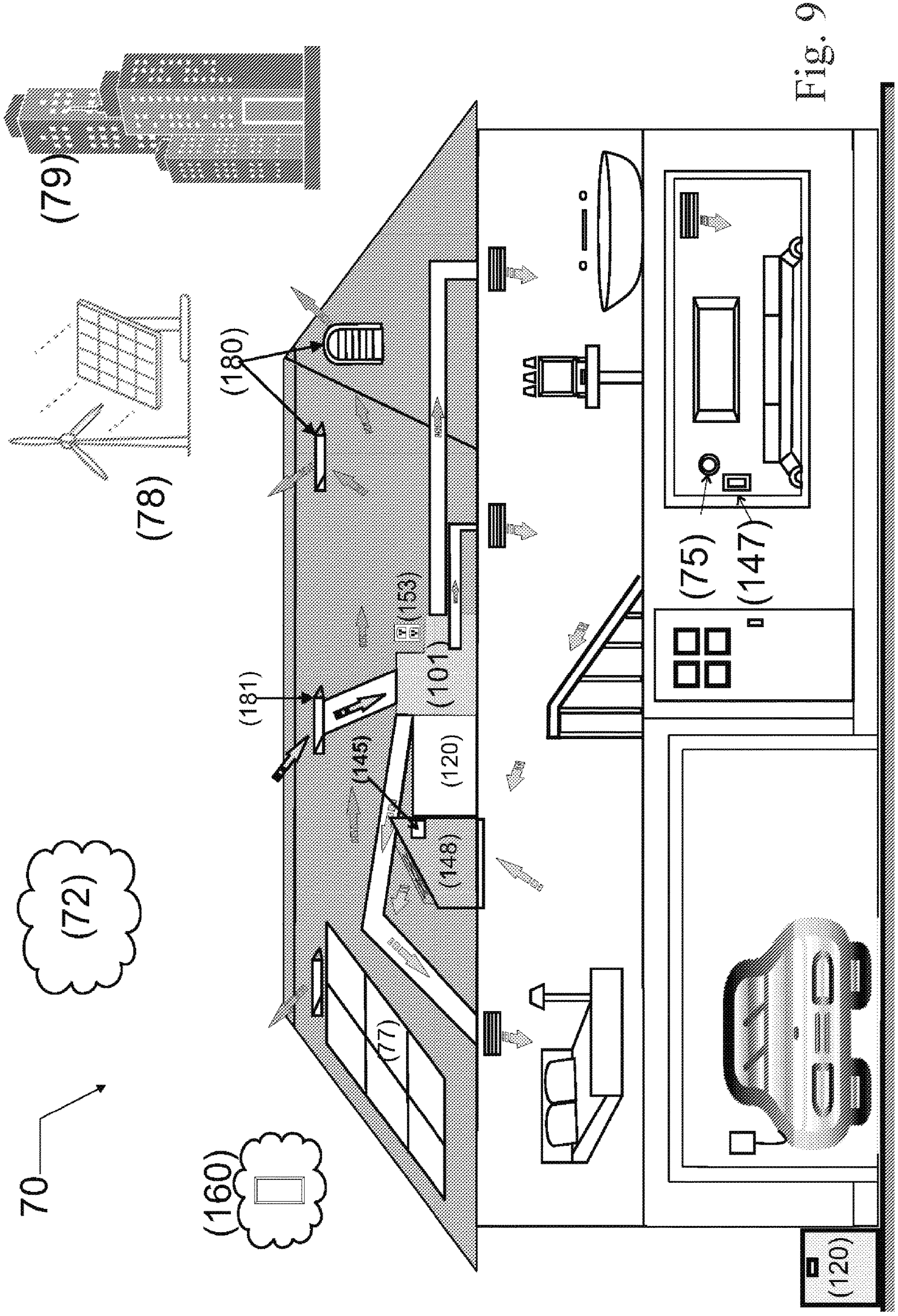
FIG. 9 illustrates an example embodiment of the CVT Green Cooling System with a CVT Whole House Fan and CVT CentraFlow installed in an energy efficient home, which is utilizing the power grid, a solar power generation system, a smart thermostat, and the mobile CVT App that is connected to the CVT Cloud Interface.

FIG. 9 illustrates an example embodiment of the CVT Green Cooling System 70 in the On position. In this case, the HVAC system 120 is shut and dampened off while utilizing the CVT GCF 148 and CVT CF 101 installed in an energy efficient home, which is utilizing the power grid 78, a solar power generation system 77 (may be optional), a smart thermostat 75 (may be optional), an optional CVT Wi-Fi wall switch 147, and the mobile CVT App 160 that is connected to the CVT Cloud Interface 72. As shown in FIG. 9, a CVT GCF 148 with a CVT CB 145 provides an alternative filtered fresh air whole house green cooling system. With the activation of a switch, smart thermostat, or App, the CVT CB 145 can shut down the heating, ventilating, and air conditioning (HVAC) unit 120 and then the actuator can move the damper from the closed position to the open position. The CVT GCF 148 can energize, pulling fresh air through the gable/roof vents 181 into the CVT CF 101 and distribute filtered fresh air into the structure through the various HVAC supply vents 73, flushing the structure and pulling the air through the CVT GCF 148 and into the interstitial regions (e.g., the attic), thereby purging the heat out of the structure through the gable/roof vents 180. Such a selective fan or vent cooling system can be implemented as described in U.S. Pat. No. 10,619,872 owned by the same entity as the present patent application.

Referring again to FIG. 9, the example embodiment of the CVT Green Cooling System 70 as referenced above, includes a CVT GCF 148, the CVT CF 101 using existing or new ducting in the structure. The CVT GCS 70 also includes a CVT CB 145, CVT Cloud 72, CVT App 160, optional CVT Wi-Fi wall switch 147, and interaction with a standard or smart thermostat 75. The CVT App 160 can be a software application executing on a mobile communication and computing device or a desktop/laptop computing device. The CVT App 160 can also be in wireless data communication with the internet cloud through a cloud interface CVT Cloud 72. As a result, the CVT App 160 can obtain data from a variety of internet-connected data sources, such as power grid monitoring sites, solar array sites, weather data sites, and the like. A wireless interface between the CVT App 160 and a local solar array control system is depicted in FIG. 9 as solar array control system interface 77. The internet-connected data sources for information on power grid status and load data are depicted in FIG. 9 as smart grid interface 78 and DER (Distributed Energy Resources) 79.

As further shown in FIG. 9, the example embodiment of the CVT Green Cooling System 70 includes a wireless interface between the CVT App 160 and a local HVAC System 120. As a result, the operation of the CVT GCF 148, the CVT CF 101, and the HVAC System 120 can all be configured, monitored, and controlled wirelessly via the CVT App 160. Additionally, the CVT App 160 can be in wireless data communication with a standard or Smart Thermostat 75 and a CVT Plug-n-Play Wi-Fi outlet/plug adaptor 153 within the structure. The CVT App 160 can also be in wireless data communication with optional CVT Wi-Fi wall switch 147, which can control various systems within the structure. Thus, the CVT App 160 can also be used to wirelessly configure, monitor, and control systems and devices within the structure to maximize the efficiency of the operation and usage of these devices given the information available to the CVT App 160 via a variety of internet-connected data sources and a variety of local data sources within the structure.

Figure 10:
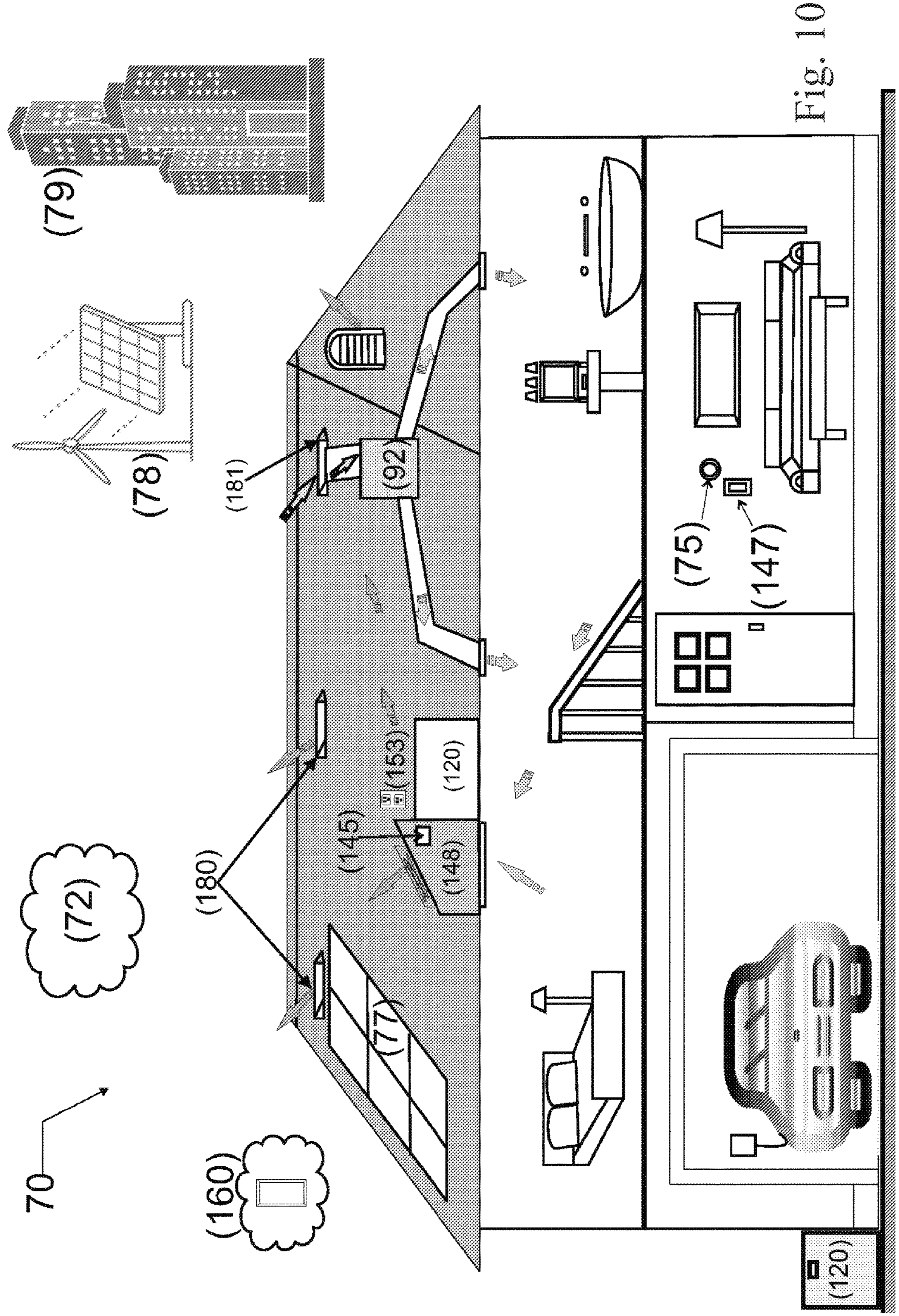
FIG. 10 illustrates an example embodiment of the CVT Green Cooling System with a CVT GCF and CVT FFC installed in an energy efficient home, which is utilizing the power grid, a solar power generation system, a smart thermostat, and the mobile CVT App that is connected to the CVT Cloud Interface.

FIG. 10 illustrates an example embodiment of the CVT Green Cooling System 70 with a CVT GCF 148 and the CVT FFC 92 installed in an energy efficient home, which is utilizing the power grid 78, a solar power generation system 77, optional CVT Wi-Fi wall switch 147, a CVT WI-FI PNP 153, a smart thermostat 75, and the mobile CVT App 160 that is connected to the CVT Cloud 72 Interface. As shown in FIG. 10, a CVT GCF 148 with a CVT CB 145 provides an alternative whole house green cooling system comprising a selective fan/return box with damper and actuator. With the activation of a switch, smart thermostat or App, the CVT Control Board or controller can shut down the heating, ventilating, and air conditioning (HVAC) unit and then the actuator can move the damper from the closed position to the open position, the CVT GCF 148 and CVT FFC 92 can energize, pulling filtered fresh air into the structure, flushing the air through the CVT GCF 148 and blowing the air through interstitial regions (e.g., the attic), thereby purging the heat out of the structure through the gable/roof vents 180. There is no need to open windows or doors. Such a selective fan or vent cooling system is described in U.S. Pat. Nos. 10,619,872 and 10,760,802 owned by the same entity as the present patent application. (Not shown in FIG. 10 is the option to use the CVT APP 160, CVT FFC 92, the CVT WI-FI PNP 153 and an existing whole house fan. There would be limited controls available.)

Referring again to FIG. 10, the example embodiment of the CVT Green Cooling System 70 shown includes a CVT GCF 148 and CVT FFC 92 system. The CVT GCF 148 and CVT FFC 92 can also include a CVT CB 145 to control operation of the CVT FFC 92. Such a CVT GCF 148 and CVT FFC 92 can be implemented as described in U.S. Pat. Nos. 10,619,872 and 10,760,802 owned by the same entity as the present patent application. The CVT CB 145 can send and receive wireless data communication with a CVT App 160, which can be used remotely. The CVT App 160 can be a software application executing on a mobile communication and computing device or a desktop/laptop computing device. The CVT App 160 can also be in wireless data communication with the internet cloud through a CVT Cloud interface 86. As a result, the CVT App 160 can obtain data from a variety of internet-connected data sources, such as power grid monitoring sites, solar array sites, weather data sites, and the like. A wireless interface between the CVT App 160 and a local solar array control system is depicted in FIG. 10 as solar array control system interface 77. Internet-connected data sources for information on power grid status and load data are depicted in FIG. 10 as smart grid interface 78 and DER (Distributed Energy Resources) 79.

As further shown in FIG. 10, the example embodiment of the CVT Green Cooling System 70 includes a wireless interface between the CVT App 160 and a local HVAC System 120. As a result, the operation of the CVT GCF 148, the CVT FFC 92, and the HVAC System 120 can all be configured, monitored, and controlled wirelessly via the CVT App 160. Additionally, the CVT App 160 can be in wireless data communication with a Smart Thermostat 75 and a CVT WI-FI PNP 153 within the structure. The CVT App 160 can also be in wireless data communication with optional CVT Wi-Fi wall switch 147, which can control various systems within the structure. Thus, the CVT App 160 can also be used to wirelessly configure, monitor, and control systems and devices within the structure to maximize the efficiency of the operation and usage of these devices given the information available to the CVT App 160 via a variety of internet-connected data sources and a variety of local data sources within the structure.

Figure 11:
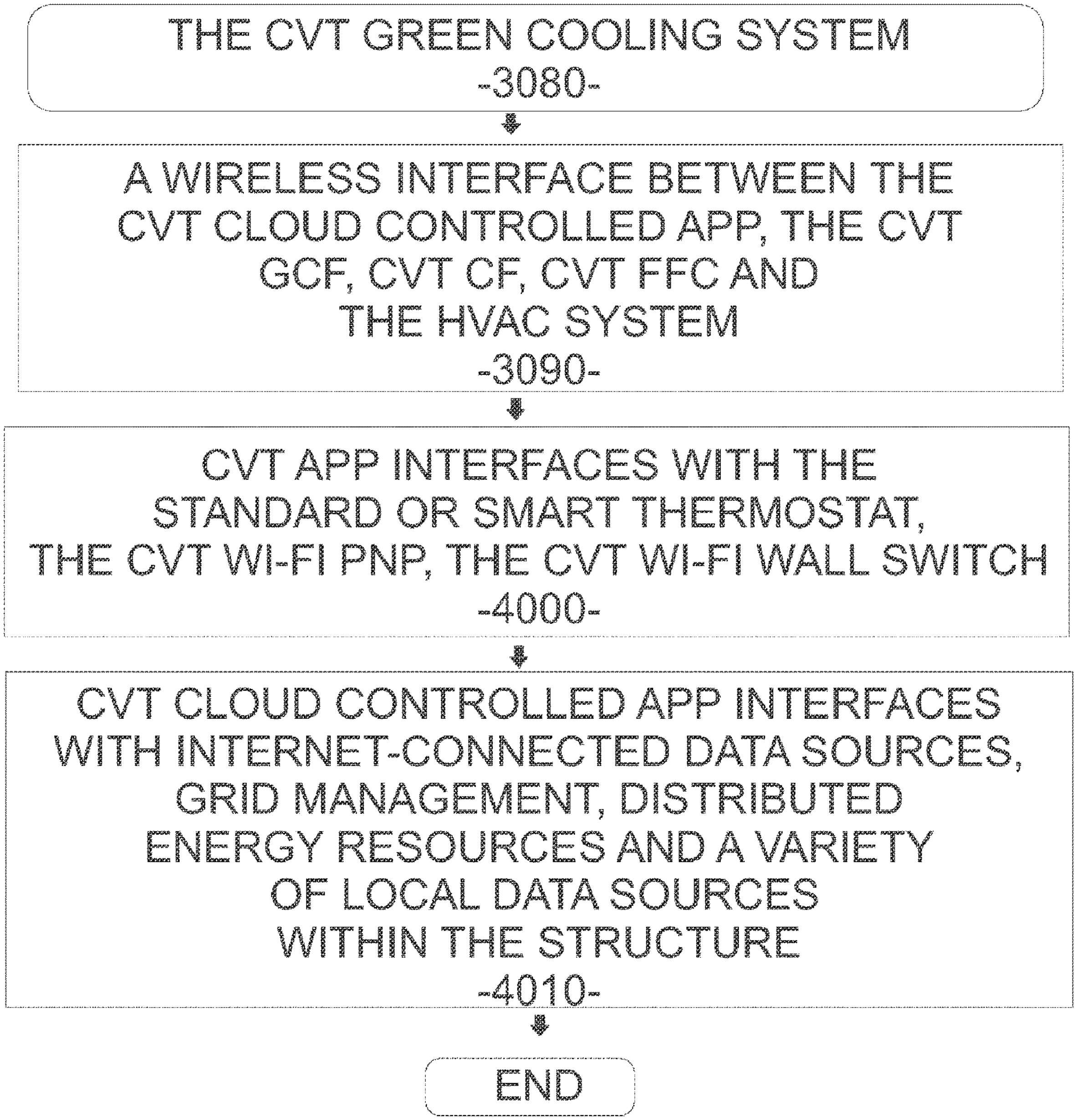
FIG. 11 illustrates a diagram representing elements of a CVT Green Cooling System according to example embodiments.

FIG. 11 illustrates a diagram representing elements of a CVT Green Cooling System 3080 according to example embodiments. In the example embodiment illustrated, the CVT Green Cooling System 3080 can include: a wireless interface between the CVT cloud controlled app, the CVT GCF, the CVT CF, the CVT FFC, and the HVAC system (element 3090); the CVT app can be configured to interface with a standard thermostat or a smart thermostat, the CVT WI-FI PNP, and the CVT WI-FI wall switch (element 4000); and the CVT cloud controlled app can be configured to interface with internet-connected data sources, grid management, distributed energy resources, and a variety of local data sources within the structure (element 4010).

Thus, the example embodiments of the CVT Green Cooling System 70 disclosed herein can use the CVT App 160 along with AI modeling and IOT technology to communicate with the power grid to determine the best time (e.g., depending on peak hours, solar capability, weather, humidity, CO/Refrigerant gas detection, etc.) to shut down the HVAC system automatically or manually and flush the structure with filtered fresh air without having to open doors or windows. The CVT Green Cooling System 70 can be utilized during peak energy usage as an alternative cooling system for the HVAC equipment. The CVT Green Cooling System 70 disclosed herein can automatically adjust temperatures as needed or by schedules, to account for indoor temperature and outdoor temperature differentiation with programmed processes to make future adjustments to the system during usage to acquire the best energy efficiency for home or buildings. The CVT Green Cooling System 70 disclosed herein can track energy usage of the structure and the related HVAC equipment along with smart thermostats. The CVT Green Cooling System 70 disclosed herein can be used to track energy savings produced by the CVT Green Cooling System 70 to be utilized or credited to designated DER's (distributed energy resource) or the like. The CVT Green Cooling System 70 disclosed herein can link energy savings to a designated DER or other generation technologies and create processes to read energy usage by temperature and time to create an efficient cycle. The CVT Green Cooling System 70 disclosed herein can manage data from data services consisting of temperature, humidity, carbon monoxide, refrigerant gas, movement detection and HVAC usage. The CVT Green Cooling System 70 disclosed herein can read, track and manage savings provided by CVT GCS 70 and HVAC equipment 120. The CVT GCS 70 disclosed herein can create data from the CVT GCS 70, HVAC equipment 120, and standard or smart thermostats 75, and then transfer the data via the cloud 72 to be used by grid management and or Distributed Energy Resources (DER). The CVT GCS 70 disclosed herein can create data from the CVT GCS 70, HVAC equipment, and CVT App 160 and transfer data via the cloud 72 to a grid elements network or grid management ecosystems both known and unknown.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, an apparatus and method for providing a cloud controlled, grid optimizing selective alternative filtered fresh air source using existing or new ducting is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A central ventilation green cooling system comprising:

a transition box with a dual position damper and actuator coupled between an existing Heating, Ventilating, and Air Conditioning (HVAC) unit having a supply plenum and an existing evaporative coil in a structure, the supply plenum of the existing HVAC unit being coupled to a plurality of new or existing HVAC supply ducts, the plurality of new or existing HVAC supply ducts coupled to a plurality of new or existing ceiling supply vents within a structure, and the plurality of new or existing ceiling supply vents having access to air inside of the structure;

a selective fan or vent cooling system installed in the structure, the selective fan or vent cooling system including a first controller;

a control board coupled to the HVAC unit and the selective fan or vent cooling system, the control board configured to control the operation of the dual position damper and actuator, the HVAC unit, and the selective fan or vent cooling system;

a selective filtered fresh air sourcing system installed in the structure, the selective filtered fresh air sourcing system including a second controller;

a mobile software application in wireless data communications with the first and second controllers, the mobile application also in data communications with a plurality of internet-connected data sources via an internet cloud interface, the internet-connected data sources including power grid monitoring sites, solar array sites, weather data sites, the mobile software application configured to control the selective fan or vent cooling system and the selective filtered fresh air sourcing system based on power grid loading information and solar array generation capacity information obtained from the internet-connected data sources.

2. The central ventilation green cooling system of claim 1 wherein the control board is coupled to all 24 volt power lines of the HVAC unit, the control board being configured to activate or deactivate operation of the HVAC unit using the 24 volt power lines.

3. The central ventilation green cooling system of claim 1 wherein the mobile software application being configured to control the selective fan or vent cooling system and the selective filtered fresh air sourcing system based on weather information obtained from the internet-connected data sources.

4. The central ventilation green cooling system of claim 1 further including:

the heating, ventilating, and air conditioning (HVAC) unit including a third controller, the mobile software application being in wireless data communications with the third controller, the mobile software application being configured to control the HVAC unit based on power grid loading information and solar array generation capacity information obtained from the internet-connected data sources.

5. The central ventilation green cooling system of claim 1 further including:

a smart thermostat and a plug-n-play unit within the structure, the mobile software application being in wireless data communications with the smart thermostat and the plug-n-play unit, the mobile software application being configured to control the smart thermostat and the plug-n-play unit based on power grid loading information and solar array generation capacity information obtained from the internet-connected data sources.

6. The central ventilation green cooling system of claim 1 further including:

a wall switch within the structure, the mobile software application being in wireless data communications with the wall switch, the mobile software application being configured to control the wall switch based on power grid loading information and solar array generation capacity information obtained from the internet-connected data sources.

7. The central ventilation green cooling system of claim 1 wherein the mobile software application being configured to determine a best time to activate or deactivate the selective fan or vent cooling system and the selective filtered fresh air sourcing system based on information obtained from the internet-connected data sources.

8. The central ventilation green cooling system of claim 1 wherein the mobile software application being configured to determine a best time to activate or deactivate the selective fan or vent cooling system and the selective filtered fresh air sourcing system based on peak power grid usage or solar power generation capacity.

9. The central ventilation green cooling system of claim 1 wherein the mobile software application being configured to track energy usage and savings in the structure produced as a result of operation of the central ventilation green cooling system.

10. The central ventilation green cooling system of claim 1 wherein the mobile software application being configured to manage data from local data sources or the internet-connected data sources providing information including:

temperature, humidity, carbon monoxide levels, refrigerant gas levels, movement detection, and heating, ventilating, and air conditioning (HVAC) unit usage.

11. The central ventilation green cooling system of claim 1 wherein the mobile software application being configured to transfer data obtained from within the structure to an internet-connected data source.

12. A central ventilation green cooling system comprising:

a transition box with a dual position damper and actuator coupled between an existing Heating, Ventilating, and Air Conditioning (HVAC) unit having a supply plenum and an existing evaporative coil in a structure, the supply plenum of the existing HVAC unit being coupled to a plurality of new or existing HVAC supply ducts, the plurality of new or existing HVAC supply ducts coupled to a plurality of new or existing ceiling supply vents within a structure, and the plurality of new or existing ceiling supply vents having access to air inside of the structure;

a selective fan or vent cooling system installed in the structure, the selective fan or vent cooling system including a first controller;

a control board coupled to the HVAC unit and the selective fan or vent cooling system, the control board configured to control the operation of the dual position damper and actuator, the HVAC unit, and the selective fan or vent cooling system;

a filtered free cooling system installed in the structure, the filtered free cooling system including a second controller;

a mobile software application in wireless data communications with the first and second controllers, the mobile application also in data communications with a plurality of internet-connected data sources via an internet cloud interface, the internet-connected data sources including power grid monitoring sites, solar array sites, weather data sites, the mobile software application configured to control the selective fan or vent cooling system and the filtered free cooling system based on power grid loading information and solar array generation capacity information obtained from the internet-connected data sources.

13. The central ventilation green cooling system of claim 12 wherein the mobile software application being configured to control the selective fan or vent cooling system and the filtered free cooling system based on weather information obtained from the internet-connected data sources.

14. The central ventilation green cooling system of claim 12 further including:

the heating, ventilating, and air conditioning (HVAC) unit including a third controller, the mobile software application being in wireless data communications with the third controller, the mobile software application being configured to control the HVAC unit based on power grid loading information and solar array generation capacity information obtained from the internet-connected data sources.

15. The central ventilation green cooling system of claim 12 further including:

a smart thermostat and a plug-n-play unit within the structure, the mobile software application being in wireless data communications with the smart thermostat and the plug-n-play unit, the mobile software application being configured to control the smart thermostat and the plug-n-play unit based on power grid loading information and solar array generation capacity information obtained from the internet-connected data sources.

16. The central ventilation green cooling system of claim 12 further including:

a wall switch within the structure, the mobile software application being in wireless data communications with the wall switch, the mobile software application being configured to control the wall switch based on power grid loading information and solar array generation capacity information obtained from the internet-connected data sources thereby becoming a distributed energy generation source to interface with distributed energy resources to create energy credit.

17. The central ventilation green cooling system of claim 12 wherein the mobile software application being configured to determine a best time to activate or deactivate the selective fan or vent cooling system and the filtered free cooling system based on information obtained from the internet-connected data sources.

18. The central ventilation green cooling system of claim 12 wherein the mobile software application being configured to determine a best time to activate or deactivate the selective fan or vent cooling system and the filtered free cooling system based peak power grid usage or solar power generation capacity.

19. The central ventilation green cooling system of claim 12 wherein the mobile software application being configured to track energy usage and savings in the structure produced as a result of operation of the central ventilation green cooling system.

20. The central ventilation green cooling system of claim 12 wherein the mobile software application being configured to manage data from local data sources or the internet-connected data sources providing information including:

temperature, humidity, carbon monoxide levels, refrigerant gas levels, movement detection, and heating, ventilating, and air conditioning (HVAC) unit usage.

21. The central ventilation green cooling system of claim 12 wherein the mobile software application being configured to transfer data obtained from within the structure to an internet-connected data source.

* * * * *